US012776206B2

(12) United States Patent
Ran et al.

(10) Patent No.: US 12,776,206 B2
(45) **Date of Patent: *Oct. 27, 2026**

(54) AUTONOMOUS VEHICLE INTELLIGENT CONTROL (AVIC) SYSTEM WITH DISTRIBUTED AI COMPUTING

(71) Applicant: CAVH LLC, Fitchburg, WI (US)

(72) Inventors: Bin Ran, Fitchburg, WI (US); Yang Cheng, Middleton, WI (US); Shen Li, Madison, WI (US); Fan Ding, Madison, WI (US); Jing Jin, Basking Ridge, NJ (US); Xiaoxuan Chen, Madison, WI (US); Zhen Zhang, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,248

(22) Filed: May 15, 2024

(65) Prior Publication Data

US 2024/0363005 A1 Oct. 31, 2024

Related U.S. Application Data

(63) Continuation of application No. 17/873,660, filed on Jul. 26, 2022, now Pat. No. 11,990,034, which is a (Continued)

(51) Int. Cl.
*G08G 1/01* (2006.01)
*G08G 1/017* (2006.01)
(Continued)

(52) U.S. Cl.
CPC ......... *G08G 1/0145* (2013.01); *G08G 1/0112* (2013.01); *G08G 1/0129* (2013.01);
(Continued)

(58) Field of Classification Search
CPC .. G08G 1/0145; G08G 1/0112; G08G 1/0129; G08G 1/0133; G08G 1/017;
(Continued)

(56) References Cited

U.S. PATENT DOCUMENTS

| | | |
|---|---|---|
| 3,824,469 A | 7/1974 | Ristenbatt |
| 4,023,017 A | 5/1977 | Ceseri |

(Continued)

FOREIGN PATENT DOCUMENTS

| | | |
|---|---|---|
| CA 2607039 A1 | 4/2008 | |
| CA 3094275 | 9/2019 | |

(Continued)

OTHER PUBLICATIONS

APGDT002, Microchip Technology Inc., http://www.microchip.com/, retrieved on: Nov. 3, 2017, 2 pages.

(Continued)

*Primary Examiner* — Tuan C To
(74) *Attorney, Agent, or Firm* — Casimir Jones, SC; Thomas A. Isenbarger

(57) ABSTRACT

The technology relates to an autonomous vehicle intelligent control (AVIC) system with distributed AI computing, which is a component of a Connected Automated Vehicle Highway (CAVH) system. This AVIC system provides training and application for distributed AI computing by providing automated vehicles (AVs) and/or connected automated vehicles (CAVs) with vehicle-specific control instructions comprising instructions for vehicle longitudinal and lateral position, speed, and steering and control. Through the system, CAVs are effectively and efficiently controlled by the AVIC system. In addition, the AVIC system provides vehicle-specific control instructions to CAVs and controls them through a hierarchy of traffic control centers/traffic control units (TCCs/TCUs) or the combination of TCCs/

(Continued)

TCUs and onboard units (OBUs) comprising vehicle control modules.

20 Claims, 25 Drawing Sheets
(23 of 25 Drawing Sheet(s) Filed in Color)

Related U.S. Application Data continuation of application No. 16/509,615, filed on Jul. 12, 2019, now Pat. No. 11,482,102, which is a continuation of application No. 15/628,331, filed on Jun. 20, 2017, now Pat. No. 10,380,886.

(60) Provisional application No. 62/507,453, filed on May 17, 2017.

(51) Int. Cl.

| | |
|---|---|
| ***G08G 1/04*** | (2006.01) |
| ***G08G 1/07*** | (2006.01) |
| ***G08G 1/0968*** | (2006.01) |
| ***H04L 67/00*** | (2022.01) |
| ***H04L 67/12*** | (2022.01) |
| ***H04W 84/00*** | (2009.01) |
| *G08G 1/042* | (2006.01) |

(52) U.S. Cl.
CPC ........... *G08G 1/0133* (2013.01); *G08G 1/017* (2013.01); *G08G 1/07* (2013.01); *G08G 1/0968* (2013.01); *H04L 67/00* (2013.01); *G08G 1/04* (2013.01); *G08G 1/042* (2013.01); *H04L 67/12* (2013.01); *H04W 84/005* (2013.01)

(58) Field of Classification Search
CPC .......... G08G 1/04; G08G 1/07; G08G 1/0968; G08G 1/042; H04L 67/00; H04L 67/12; H04W 84/005
USPC .......................................................... 701/118
See application file for complete search history.

(56) References Cited

U.S. PATENT DOCUMENTS

| | | | |
|---|---|---|---|
| 4,704,610 | A | 11/1987 | Smith et al. |
| 4,962,457 | A | 10/1990 | Chen et al. |
| 5,420,794 | A | 5/1995 | James |
| 5,504,683 | A | 4/1996 | Gurmu |
| 5,610,821 | A | 3/1997 | Gazis et al. |
| 5,625,559 | A | 4/1997 | Egawa |
| 5,732,785 | A | 3/1998 | Ran et al. |
| 6,028,537 | A | 2/2000 | Suman et al. |
| 6,064,318 | A | 5/2000 | Kirchner, III et al. |
| 6,317,682 | B1 | 11/2001 | Ogura et al. |
| 6,708,107 | B2 | 3/2004 | Impson et al. |
| 6,829,531 | B2 | 12/2004 | Lee |
| 6,900,740 | B2 | 5/2005 | Bloomquist et al. |
| 6,952,156 | B2 | 10/2005 | Arshad et al. |
| 7,098,806 | B2 | 8/2006 | Bachelder |
| 7,295,904 | B2 | 11/2007 | Kanevsky et al. |
| 7,324,893 | B2 | 1/2008 | Yamashita et al. |
| 7,343,243 | B2 | 3/2008 | Smith |
| 7,382,274 | B1 | 6/2008 | Kermani et al. |
| 7,418,346 | B2 | 8/2008 | Breed et al. |
| 7,421,334 | B2 | 9/2008 | Dahlgren et al. |
| 7,425,903 | B2 | 9/2008 | Boss et al. |
| 7,439,853 | B2 | 10/2008 | Tengler et al. |
| 7,554,435 | B2 | 6/2009 | Tengler et al. |
| 7,725,249 | B2 | 5/2010 | Kickbusch |
| 7,860,639 | B2 | 12/2010 | Yang |
| 7,894,951 | B2 | 2/2011 | Norris et al. |
| 7,979,172 | B2 | 7/2011 | Breed |
| 8,181,037 | B2 | 5/2012 | Chen et al. |
| 8,352,112 | B2 | 1/2013 | Mudalige |
| 8,527,139 | B1 | 9/2013 | Yousuf |
| 8,576,069 | B2 * | 11/2013 | Nadeem ........... G08G 1/096741 340/995.13 |
| 8,589,070 | B2 | 11/2013 | Ban |
| 8,630,795 | B2 | 1/2014 | Breed et al. |
| 8,682,511 | B2 | 3/2014 | Andreasson |
| 8,972,080 | B2 | 3/2015 | Shida et al. |
| 9,053,636 | B2 | 6/2015 | Gordon |
| 9,076,332 | B2 | 7/2015 | Myr |
| 9,120,485 | B1 | 9/2015 | Dolgov |
| 9,147,294 | B1 | 9/2015 | Weinfield |
| 9,182,951 | B1 | 11/2015 | Ormerod et al. |
| 9,349,055 | B1 | 5/2016 | Ogale |
| 9,355,423 | B1 | 5/2016 | Slusar |
| 9,478,129 | B1 | 10/2016 | Vaibhavi et al. |
| 9,494,935 | B2 | 11/2016 | Okumura et al. |
| 9,495,874 | B1 | 11/2016 | Zhu et al. |
| 9,536,427 | B2 | 1/2017 | Tonguz et al. |
| 9,562,787 | B2 | 2/2017 | Kojima et al. |
| 9,595,190 | B2 | 3/2017 | Mccrary |
| 9,646,496 | B1 | 5/2017 | Miller et al. |
| 9,654,511 | B1 | 5/2017 | Brocco et al. |
| 9,665,101 | B1 | 5/2017 | Templeton |
| 9,731,713 | B2 | 8/2017 | Horii |
| 9,747,793 | B1 * | 8/2017 | Li .......................... G08G 1/095 |
| 9,767,687 | B2 | 9/2017 | Gupta et al. |
| 9,799,224 | B2 | 10/2017 | Okamoto |
| 9,811,085 | B1 | 11/2017 | Hayes et al. |
| 9,840,253 | B1 | 12/2017 | Prasad et al. |
| 9,845,096 | B2 | 12/2017 | Urano et al. |
| 9,940,840 | B1 | 4/2018 | Schubert et al. |
| 9,947,052 | B1 | 4/2018 | Slusar et al. |
| 9,964,948 | B2 | 5/2018 | Ullrich et al. |
| 10,074,223 | B2 | 9/2018 | Newman |
| 10,074,273 | B2 | 9/2018 | Yokoyama et al. |
| 10,081,357 | B2 | 9/2018 | Saigusa et al. |
| 10,185,999 | B1 | 1/2019 | Konrardy et al. |
| 10,262,537 | B1 | 4/2019 | Kim et al. |
| 10,380,886 | B2 | 8/2019 | Ran et al. |
| 10,421,459 | B2 | 9/2019 | Goldman-Shenhar et al. |
| 10,423,971 | B2 | 9/2019 | Bansal et al. |
| 10,593,198 | B2 | 3/2020 | Benhammou et al. |
| 10,818,170 | B1 * | 10/2020 | Rangan ................ H04W 4/023 |
| 11,482,102 | B2 | 10/2022 | Ran et al. |
| 11,955,002 | B2 | 4/2024 | Ran et al. |
| 2002/0008637 | A1 | 1/2002 | Lemelson et al. |
| 2002/0103622 | A1 | 8/2002 | Burge |
| 2002/0186144 | A1 | 12/2002 | Meunier |
| 2003/0045995 | A1 | 3/2003 | Lee |
| 2004/0145496 | A1 | 7/2004 | Ellis |
| 2004/0230393 | A1 | 11/2004 | Tzamaloukas |
| 2005/0060069 | A1 | 3/2005 | Breed et al. |
| 2005/0102098 | A1 | 5/2005 | Montealegre et al. |
| 2005/0209769 | A1 | 9/2005 | Yamashita et al. |
| 2005/0222760 | A1 | 10/2005 | Cabral et al. |
| 2006/0025897 | A1 | 2/2006 | Shostak et al. |
| 2006/0142933 | A1 | 6/2006 | Feng |
| 2006/0226968 | A1 | 10/2006 | Tengler et al. |
| 2006/0251498 | A1 | 11/2006 | Buzzoni et al. |
| 2006/0287818 | A1 | 12/2006 | Okude et al. |
| 2007/0093997 | A1 | 4/2007 | Yang et al. |
| 2007/0146162 | A1 | 6/2007 | Tengler et al. |
| 2008/0030313 | A1 | 2/2008 | Obradovich |
| 2008/0042815 | A1 | 2/2008 | Breed et al. |
| 2008/0095163 | A1 | 4/2008 | Chen et al. |
| 2008/0150786 | A1 | 6/2008 | Breed |
| 2008/0161986 | A1 | 7/2008 | Breed et al. |
| 2008/0161987 | A1 | 7/2008 | Breed |
| 2008/0275646 | A1 | 11/2008 | Perng et al. |
| 2010/0013629 | A1 | 1/2010 | Sznaider et al. |
| 2010/0070167 | A1 | 3/2010 | Mudalige |
| 2010/0256836 | A1 | 10/2010 | Mudalige et al. |
| 2011/0095908 | A1 | 4/2011 | Nadeem et al. |
| 2011/0184596 | A1 | 7/2011 | Andreasson |
| 2011/0210867 | A1 | 9/2011 | Benedikt |
| 2011/0224892 | A1 | 9/2011 | Speiser |

(56) References Cited

U.S. PATENT DOCUMENTS

2011/0227757 A1* 9/2011 Chen ................ G08G 1/096791 340/902
2012/0017262 A1 1/2012 Kapoor et al.
2012/0022776 A1 1/2012 Razavilar et al.
2012/0029799 A1 2/2012 Miller
2012/0059574 A1* 3/2012 Hada .................... G08G 1/0112 701/119
2012/0105639 A1 5/2012 Stein et al.
2012/0143786 A1 6/2012 Karner
2012/0283910 A1 11/2012 Lee et al.
2012/0303807 A1 11/2012 Akelbein et al.
2013/0041574 A1 2/2013 Koshizen
2013/0116915 A1 5/2013 Ferreira et al.
2013/0137457 A1 5/2013 Potkonjak
2013/0138714 A1 5/2013 Ricci
2013/0141580 A1 6/2013 Stein et al.
2013/0204484 A1 8/2013 Ricci
2013/0218412 A1 8/2013 Ricci
2013/0297140 A1 11/2013 Montemerlo et al.
2013/0297196 A1 11/2013 Shida
2013/0301584 A1 11/2013 Addepalli et al.
2014/0112410 A1 4/2014 Yokoyama
2014/0219505 A1 8/2014 Kindo et al.
2014/0222322 A1 8/2014 Durekovic
2014/0278026 A1 9/2014 Taylor
2014/0278029 A1 9/2014 Tonguz et al.
2014/0278052 A1 9/2014 Slavin et al.
2014/0354451 A1 12/2014 Tonguz et al.
2015/0006067 A1 1/2015 Lees et al.
2015/0149059 A1 5/2015 Choi
2015/0153013 A1 6/2015 Wu et al.
2015/0166072 A1 6/2015 Powers et al.
2015/0169018 A1 6/2015 Rogöet al.
2015/0197247 A1 7/2015 Ichinokawa
2015/0199685 A1 7/2015 Betancourt et al.
2015/0211868 A1 7/2015 Matsushita et al.
2015/0266488 A1 9/2015 Solyom et al.
2015/0266489 A1 9/2015 Solyom et al.
2015/0310742 A1 10/2015 Albornoz
2015/0353094 A1 12/2015 Harda et al.
2016/0042303 A1 2/2016 Medina et al.
2016/0059855 A1 3/2016 Rebhan et al.
2016/0070626 A1 3/2016 Raghavendra
2016/0086391 A1 3/2016 Ricci
2016/0110820 A1 4/2016 Fleck et al.
2016/0129908 A1 5/2016 Harda
2016/0132705 A1 5/2016 Kovarik et al.
2016/0139594 A1 5/2016 Okumura et al.
2016/0142492 A1 5/2016 Fang et al.
2016/0148440 A1 5/2016 Kwak
2016/0216130 A1 7/2016 Abramson et al.
2016/0221186 A1 8/2016 Perrone
2016/0231746 A1 8/2016 Hazelton et al.
2016/0232788 A1 8/2016 Jung et al.
2016/0236683 A1 8/2016 Eggert et al.
2016/0238703 A1 8/2016 Liu et al.
2016/0280224 A1 9/2016 Tatourian et al.
2016/0325753 A1 11/2016 Stein et al.
2016/0328272 A1 11/2016 Ahmed et al.
2016/0330036 A1 11/2016 Zhou et al.
2016/0347327 A1 12/2016 Kondo et al.
2016/0370194 A1 12/2016 Colijn et al.
2016/0371553 A1 12/2016 Farnham, IV et al.
2017/0018187 A1 1/2017 Kim et al.
2017/0022925 A1 1/2017 Kim
2017/0026893 A1 1/2017 Lagassey
2017/0039435 A1 2/2017 Ogale et al.
2017/0046883 A1 2/2017 Gordon et al.
2017/0053529 A1 2/2017 Yokoyama et al.
2017/0072967 A1 3/2017 Fendt et al.
2017/0075195 A1 3/2017 Stein et al.
2017/0085632 A1 3/2017 Cardote
2017/0090994 A1 3/2017 Jubinski et al.
2017/0092126 A1 3/2017 Oshida et al.
2017/0109644 A1 4/2017 Nariyambut et al.
2017/0124869 A1 5/2017 Popple
2017/0131435 A1 5/2017 Peacock et al.
2017/0132922 A1 5/2017 Gupta et al.
2017/0190331 A1 7/2017 Gupta et al.
2017/0206783 A1 7/2017 Miller
2017/0219369 A1 8/2017 Lei et al.
2017/0262790 A1 9/2017 Khasis
2017/0276492 A1 9/2017 Ramasamy
2017/0309171 A1 10/2017 Zhao et al.
2017/0324817 A1 11/2017 Oliveir et al.
2017/0337571 A1 11/2017 Bansal et al.
2017/0339224 A1 11/2017 Condeixa et al.
2017/0345298 A1 11/2017 Tandai et al.
2017/0357980 A1 12/2017 Bakun et al.
2017/0365166 A1 12/2017 Lu et al.
2018/0005525 A1 1/2018 Parundekar et al.
2018/0018216 A1 1/2018 Halford et al.
2018/0018877 A1 1/2018 Townsend
2018/0018888 A1 1/2018 Townsend
2018/0040246 A1 2/2018 Yonemura et al.
2018/0053413 A1 2/2018 Patil et al.
2018/0053415 A1 2/2018 Krunic et al.
2018/0061151 A1 3/2018 Chainer et al.
2018/0065637 A1 3/2018 Bassindale
2018/0075538 A1 3/2018 Konrardy et al.
2018/0096597 A1* 4/2018 Mortazavi ............. H04W 4/023
2018/0113450 A1 4/2018 Sherony
2018/0114079 A1 4/2018 Myers et al.
2018/0136651 A1 5/2018 Levinson et al.
2018/0137373 A1 5/2018 Rasmusson, Jr. et al.
2018/0141562 A1 5/2018 Singhal
2018/0151064 A1 5/2018 Xu et al.
2018/0156625 A1 6/2018 Mangal et al.
2018/0158327 A1 6/2018 Gärtner
2018/0158340 A1 6/2018 De Moura
2018/0167790 A1 6/2018 Cavalcanti et al.
2018/0174449 A1 6/2018 Nguyen
2018/0188742 A1 7/2018 Wheeler
2018/0190116 A1 7/2018 Bauer et al.
2018/0194352 A1 7/2018 Avedisov et al.
2018/0233047 A1 8/2018 Mandeville-Clarke
2018/0237018 A1 8/2018 Goto et al.
2018/0237019 A1 8/2018 Goto et al.
2018/0262887 A1 9/2018 Futaki
2018/0286227 A1* 10/2018 Sorgatz ................ G08G 1/0112
2018/0299274 A1 10/2018 Moghe et al.
2018/0308344 A1 10/2018 Ravindranath et al.
2018/0336780 A1 11/2018 Ran et al.
2019/0042863 A1 2/2019 Kasuga
2019/0051154 A1 2/2019 Macfarlane et al.
2019/0064823 A1 2/2019 Jiang et al.
2019/0096238 A1 3/2019 Ran et al.
2019/0156594 A1 5/2019 Snyder et al.
2019/0156668 A1 5/2019 Liang et al.
2019/0213888 A1 7/2019 Koishi et al.
2019/0244518 A1 8/2019 Yang et al.
2019/0244521 A1 8/2019 Ran et al.
2019/0382023 A1 12/2019 Takeda et al.
2020/0074861 A1 3/2020 Park et al.
2020/0351205 A1 11/2020 Filley
2020/0410787 A1 12/2020 Petousis et al.
2021/0076180 A1 3/2021 Parker et al.
2021/0215491 A1 7/2021 Liu et al.
2021/0280055 A1 9/2021 Ricci
2021/0312375 A1 10/2021 Khasis
2022/0057227 A1 2/2022 Koenig et al.
2022/0289252 A1 9/2022 Liu et al.
2022/0381568 A1 12/2022 Chase et al.
2023/0143946 A1 5/2023 Konrardy et al.
2024/0137850 A1 4/2024 Nathanson
2025/0087081 A1 3/2025 Ran et al.

FOREIGN PATENT DOCUMENTS

CN 102768768 A 11/2012
CN 103854473 A 6/2014
CN 104485003 A 4/2015
CN 104485003 B 4/2015
CN 204759749 U 11/2015

(56) References Cited

FOREIGN PATENT DOCUMENTS

| | | | | |
|---|---|---|---|---|
| CN | 102768768 B | | 3/2016 | |
| CN | 105788328 | | 7/2016 | |
| CN | 205609012 U | | 9/2016 | |
| CN | 106710203 A | | 5/2017 | |
| CN | 107665578 A | | 2/2018 | |
| CN | 107807633 A | | 3/2018 | |
| CN | 108039053 A | | 5/2018 | |
| CN | 108447291 A | | 8/2018 | |
| EP | 2395472 A1 | | 12/2011 | |
| EP | 2453207 A2 | * | 5/2012 | ......... G01C 21/3647 |
| EP | 2541208 A2 | | 1/2013 | |
| JP | H10207504 A | | 8/1998 | |
| JP | 2001134866 A | | 5/2001 | |
| JP | 2002251690 | | 9/2002 | |
| JP | 2003141676 A | | 5/2003 | |
| JP | 2005267505 A | | 9/2005 | |
| JP | 2006228064 A | | 8/2006 | |
| JP | 2016110413 A | | 6/2016 | |
| JP | 2017084034 A | | 5/2017 | |
| JP | 2017202827 A | | 11/2017 | |
| JP | 2017211366 A | | 11/2017 | |
| JP | 2017228286 A | | 12/2017 | |
| KR | 19990075982 A | | 10/1999 | |
| KR | 20110058384 A | | 6/2011 | |
| KR | 20170008703 A | | 1/2017 | |
| KR | 20170126293 A | | 11/2017 | |
| WO | WO-1995021405 A2 | | 8/1995 | |
| WO | WO-1996007167 A1 | | 3/1996 | |
| WO | WO-2012033706 A2 | | 3/2012 | |
| WO | WO-2014061198 A1 | | 4/2014 | |
| WO | WO-2014075548 A1 | | 5/2014 | |
| WO | WO 2015/114592 A1 | | 8/2015 | |
| WO | WO 2015/180090 | | 12/2015 | |
| WO | WO-2016077027 A1 | | 5/2016 | |
| WO | WO-2016126317 A1 | | 8/2016 | |
| WO | WO-2016135561 A1 | | 9/2016 | |
| WO | WO 2017/043032 | | 3/2017 | |
| WO | WO-2017049978 A1 | | 3/2017 | |
| WO | WO 2017/079474 A2 | | 5/2017 | |
| WO | WO-2017072505 A1 | * | 5/2017 | ........... G08G 1/0116 |
| WO | WO-2017079222 A1 | | 5/2017 | |
| WO | WO-2017115342 A1 | | 7/2017 | |
| WO | WO-2017160276 A1 | | 9/2017 | |
| WO | WO-2018039134 A1 | | 3/2018 | |
| WO | WO 2018/132378 | | 7/2018 | |
| WO | WO 2019/156955 A1 | | 8/2019 | |
| WO | WO 2019/156956 A1 | | 8/2019 | |

OTHER PUBLICATIONS

Automated Driving Systems Issued Jan. 2014, downloaded Sep. 17, 2019, 12 pages.

Bergenhem et al. "Overview of Platooning Systems", ITS World Congress, Vienna, Oct. 22-26, 2012, 8 pages.

Christopher et al. Radio Tomography for Roadside Surveillance. 2014. vol. 8, Publisher: IEEE.

Conduent™—Toll Collection SolutionsConduent™—Toll Collection Solutions, https://www.conduent.com/solution/transportation-solutions/electronic-toll-collection/, retrieved on: Nov. 3, 2017, 3 pages.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity," FP Think: Effects of Next-Generation Vehicles on Travel Demand and Highway Capacity Feb. 2014, [retrieved on Jun. 13, 2019]. Retrieved from the. Internet: <URL:http://www.fehrandpeers.com/wp-content/uploads/2015/07/FP_Thing_Next_Gen_White_Paper_FINAL.pdf>pp. 1-39.

Findler, N.V. et al., "A semi-autonomous decentralized system for controlling street traffic signals," 1995, Publisher: IEEE.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

Marketa et al. Fully Automatic Roadside Camera Calibration for Traffic Surveillance. 2015, vol. 16, Publisher: IEEE.

Miami Dade Transportation Planning Organization "First Mile-Last Mile Options with Hight Trip Generator Employers." MiamiDadeTPO.org. pp. 1-99 Jan. 31, 2018, [retrieved on Jun. 13, 2019]. Retrieved from the Internet:<URL:http://www.miamidadetpo.org/library/studies/first-mile-last-mile-options-with-high-trip-generator-employers-2017-12.pdf>.

MK5 V2X , Cohda Wireless, http://cohdawireless.com, retrieved on: Nov. 3, 2017, 2 pages.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro Area Value Pricing Feasibility Analysis" Oregon Department of Transportation, Jan. 23, 2018, pp. 1-29, [retrieved on Jun. 13, 2019]. Retrieved from the Internet: <URL:https://www.oregon.gov/ODOT/KOM/VP-TM2-InitialConcepts.PDF>.

Products for Toll Collection—Mobility—SiemensProducts for Toll Collection—Mobility—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

R-Fans_16 from Beijing Surestar Technology Co. Ltd, http://www.isurestar.com/index.php/en-product-product.html#9, retrieved on: Nov. 3, 2017, 7 pages.

Society of Automotive Engineers International's new standard J3016: "(R) Taxonomy and Definitions for Terms Related to Driving Automation Systems for On-Road Motor Vehicles" Revised Sep. 2016, downloaded Dec. 12, 2016, 30 pages.

Society of Automotive Engineers International's new standard J3016: Taxonomy and Definitions for Terms Related to On-Road Motor Vehicle.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

TDC-GPX2 LIDAR of precision-measurement-technologies, http://pmt-fl.com, retrieved on: Nov. 3, 2017, 2 pages.

Teletrac Navman http://drive.teletracnavman.com/, retrieved on: Nov. 3, 2017, 2 pages.

Vector CANalyzer9.0 from vector, https://vector.com, retrieved on Nov. 3, 2017, 1 page.

Williams "Transportation Planning Implications of Automated/Connected Vehicles on Texas Highways" Texas A&M Transportation Institute, Apr. 2017, 34 pages.

Al Najada H., et al., "Autonomous Vehicles Safe-optimal Trajectory Selection Based on Big Data Analysis and Predefined User Preferences," 2016 IEEE 7th Annual Ubiquitous Computing, Electronics & Mobile Communication Conference (UEMCON), New York, 2016, pp. 1-6 (7 Pages).

Albus J.S., et al., "A Reference Model Architecture for Intelligent Vehicle and Highway Systems," Proceedings of the Intelligent Vehicles '92 Symposium, Detroit, MI, USA, 1992, pp. 378-384.

Al-Sultan S., et al., "A Comprehensive Survey on Vehicular Ad Hoc Network," Journal of Network and Computer Applications, Jan. 2014, vol. 37, pp. 380-392.

Bhat C., "Travel Modeling in an Era of Connected and Automated Transportation Systems: An Investigation in the Dallas-Fort Worth Area," Technical Report 122, Center for Transportation Research, Feb. 2017, pp. 1-61 (61 Pages), [Retrieved on Sep. 3, 2019], Retrieved from URL: https://www.caee.utexas.edu/prof/bhat/REPORTS/DSTOP_122.pdf.

Dr. Doshi N., et al., "Security for Cloud Storage Systems" Review of the Book, MEFHI, Gauridad Campus, India, 2014, pp. 1-2, [Retrieved on Sep. 5, 2019], https://www.iacr.org/books/2014_sp_yang_cloudstorage.pdf.

Flammini A., et al., "Wireless Sensor Networking in the Internet of Things and Cloud Computing Era," Procedia Engineering, 2014,

(56) References Cited

OTHER PUBLICATIONS vol. 87, pp. 672-679, DOI: 10.1016/j.proeng.2014.11.577, XP055564887, [Retrieved on Sep. 5, 2019], Retrieved from URL: https://core.ac.uk/download/pdf/82123226.pdf.
Johri R., et al., "A Multi-Scale Spatiotemporal Perspective of Connected and Automated Vehicles: Applications and Wireless Networking," In IEEE Intelligent Transportation Systems Magazine, Summer, 2016, vol. 8, No. 2, pp. 65-73 (9 Pages).
Kitazono S., et al., "Semi-Autonomous Adaptive Cruise Control in Mixed Traffic," IEEE, SICE-ICASE International Joint Conference, Oct. 18-21, 2006, pp. 3240-3245.
Maass H., et al., "Data Processing of High-Rate Low-Voltage Distribution Grid Recordings for Smart Grid Monitoring and Analysis," EURASIP Journal on Advances in Signal Processing, 2015, vol. 2015, No. 14, pp. 1-21 (18 Pages), DOI: 10.1186/sl3634-015-02034, [Retrieved on Sep. 3, 2019], Retrieved from URL: https://link.springer.com/content/pdf/10.1186%2Fsl3634-015-0203-4.pdf.
Moura T., et al., "Traffic Sign Recognition for Autonomous Driving Robot," IEEE International Conference on Autonomous Robot Systems and Competitions (ICARSC), Espinho, Portugal, May 14-15, 2014, pp. 303-308.
National Association of City Transportation Officials: "Blueprint for Autonomous Urbanism," New York, NY10017, Fall 2017, Module No. 1, Designing Cities Edition, 60 Pgs, [Retrieved on Sep. 5, 2019], Retrieved from URL: https://nacto.org/wp-content/uploads/2017/II/BAU_Modl_raster-sm.pdf.
Southwest Research Institute: "Basic Infrastructure Message Development and Standards Support for Connected Vehicles Applications," Apr. 24, 2018, pp. 1-76 (76 Pages), [Retrieved on Sep. 3, 2019] Retrieved from URL: http://www.cts.virginia.edu/wp-content/uploads/2018/12/Task4-Basic-Infrastructure-Message-Development-20180425-Final.pdf.
Surakitbanharn C.A., et al., " Connected and Autonomous Vehicles: A Policy Review" Purdue Policy Research Institute, Feb. 2018, pp. 1-17, Retrieved on [Sep. 3, 2019].
Wang Y., et al., "Intelligent Network Traffic Control by Integrating Top-down and Bottom-up Control", IEEE, 2009, pp. 1557-1562.
Baskar et al. Hierarchical Traffic Control and Management with Intelligent Vehicles. Intelligent Vehicles Symposium, 2007 IEEE, PI, Jun. 1, 2007, pp. 834-839.

* cited by examiner

AUTONOMOUS VEHICLE INTELLIGENT CONTROL (AVIC) SYSTEM WITH DISTRIBUTED AI COMPUTING

The present application is a continuation of U.S. patent application Ser. No. 17/873,660, filed Jul. 26, 2022, now U.S. Pat. No. 11,990,034, issued May 21, 2024, which is a continuation of U.S. patent application Ser. No. 16/509,615, filed Jul. 12, 2019, now U.S. Pat. No. 11,482,102, issued Oct. 25, 2022, which is a continuation of U.S. patent application Ser. No. 15/628,331, filed Jun. 20, 2017, now U.S. Pat. No. 10,380,886, issued Aug. 13, 2019, which claims the benefit of U.S. Provisional Patent Application No. 62/507,453, filed May 17, 2017, each of which is herein incorporated by reference in its entirety.

FIELD

The present invention relates generally to a comprehensive system providing full vehicle operations and control for connected and automated vehicles (CAV), and, more particularly, to a system controlling CAVs by sending individual vehicles with detailed and time-sensitive control instructions for vehicle following, lane changing, route guidance, and related information.

BACKGROUND

Autonomous vehicles, vehicles that are capable of sensing their environment and navigating without or with reduced human input, are in development. At present, they are in experimental testing and not in widespread commercial use. Existing approaches require expensive and complicated on-board systems, making widespread implementation a substantial challenge.

SUMMARY

The present invention provides a comprehensive system providing full vehicle operations and control for connected and automated vehicle and highway systems by sending individual vehicles with detailed and time-sensitive control instructions. It is suitable for a portion of lanes, or all lanes of the highway. Those instructions are vehicle specific and they are sent by lowest level traffic control units (TCUs), which are optimized and passed from top level traffic control centers (TCCs). These TCC/TCUs are in a hierarchical structure and cover different levels of areas.

In some embodiments, the systems and methods provide a transportation management system, or use thereof, that provides full vehicle operations and control for connected and automated vehicle and highway systems by sending individual vehicles with detailed and time-sensitive control instructions for one or more or all of vehicle following, lane changing, route guidance, and related information. In some embodiments, the systems and methods comprise one or more or all of: a) a hierarchy of traffic control centers/units (TCCs/TCUs), that process information and give traffic operations instructions, wherein said TCCs and TCUs are automatic or semi-automated computational modules that focus on data gathering, information processing, network optimization, and traffic control; b) a network of Road Side Units (RSUs), that receive data flow from connected vehicles, detect traffic conditions, and send targeted instructions to vehicles, wherein, in some embodiments, said RSU network focuses on data sensing, data processing, control signal delivery, and information distribution, and point or segment TCUs can be combined or integrated with a RSU; c) a vehicle sub-system housed on one or more vehicles, collectively comprising, for example, a mixed traffic flow of vehicles at different levels of connectivity and automation; and d) communication systems, that provide wired and wireless communication services to one or more or all the entities in the system.

One or more entities may manage, control, or own one or more of the components. Entities include individuals in vehicles, private and public transportation agencies, communication providers, and third party managers. Individually managed components may be configured to communication with and control or be controlled by one or more other components. For example, an autonomous vehicle control system housed in a vehicle may comprise one or more or all of: a) a communication link with a hierarchy of traffic control centers/units (TCCs/TCUs), which process information and give traffic operations instructions, wherein said TCCs and TCUs are automatic or semi-automated computational modules that focus on data gathering, information processing, network optimization, and traffic control; b) a communication link with network of Road Side Units (RSUs), which receive data flow from connected vehicles, detect traffic conditions, and send targeted instructions to vehicles, wherein said RSU network focuses on data sensing, data processing, control signal delivery, and information distribution, and said point or segment TCU can be combined or integrated with a RSU; and a vehicle sub-system, configured to receive detailed and time-sensitive control instructions for vehicle following, lane changing, route guidance, and related information.

In some embodiments, the systems and methods are configured to be operational on a portion of the available lane(s), or all the lanes of a road or highway.

In some embodiments, information is customized for each individual vehicle served by the system; said information including one or more or all of: weather, pavement conditions, and estimated travel time; and said information including vehicle control instructions including one or more or all of speed, spacing, lane designation, and routing.

In some embodiments, information is sent from an upper level TCC/TCU to a lower level TCC/TCUs, and includes one or more or all of: a desirable speed, a desirable spacing of vehicles, a desirable traffic volume, a desirable traffic split at access points, and traffic signal timing parameters.

In some embodiments, the system employs hardware comprising one or more or all of: a power supply, traffic sensors, wired and wireless communication modules, and a data storage device and database.

In some embodiments, the systems and methods are configured for use with a sensor selected from the group consisting of: a microwave system; an inductive loop system; an inferred system; a video camera system; and a laser system.

In some embodiments, the systems and methods comprise a hierarchy of Traffic Control Centers/Units (TCCs/TCUs) comprising one or more of: Macroscopic TCCs, that process information from regional TCCs and provide control targets to regional TCCs; Regional TCCs, that process information from corridor TCCs and provide control targets to corridor TCCs; Corridor TCCs, that process information from Macroscopic and segment TCUs and provide control targets to segment TCUs; Segment TCUs, that process information from corridor/point TOCs and provide control targets to point TCUs; and Point TCUs, that process information from the segment TCU and RSUs and provide vehicle-based control instructions to RSU.

In some embodiments, the Macroscopic TCC: provides control target to Regional TCCs; collects related data from regional TCCs; archives historical data in a data center, to support information processing and a strategy optimizer; provides an automatic or semi-automated computational center that focuses on data gathering, information processing, network optimization, and traffic control signals; and controls multiple regional TCCs in a large scale area and communicates with regional TCCs using high volume capacity and low latency communication media, such as optical fiber.

In some embodiments, the Regional TCC: provides control target to corridor TCCs; collects related data from corridor TCCs; archives historical data in a data center, to support the information processing and a strategy optimizer; provides an automatic or semi-automated computational center that focuses on data gathering, information processing, network optimization, and traffic control signals for a region such as a city; and controls multiple Corridor TCCs within its coverage, communicates with corridor TCCs and the upper level macroscopic TCC using high volume capacity and low latency communication media, such as optical fiber.

In some embodiments, the Corridor TCC: provides control target to segment TCUs; collects related data from segment TCUs; provides optimizer and processor modules to process information and provide control targets; provides an automatic or semi-automated computational center that focuses on data gathering, information processing, network optimization, and traffic control signals for a long roadway corridor, such as a 10-mile long freeway stretch plus local road in the vicinity; and contains a calculation server, a data warehouse, and data transfer units, with image computing ability calculating the data collected from road controllers, and controls Segment TCCs within its coverage, wherein a traffic control algorithm of TCC is used to control Point TCCs (e.g. adaptive predictive traffic control algorithm), a Corridor TCC communicates with segment TCUs and its upper Regional TCC using high volume capacity and low latency communication media, such as optical fiber, and said corridor TCC covers 5-20 miles (or longer or shorter distances).

In some embodiments, the Segment TCU: provides control target to point TCUs; collects related data from point TCUs; provides optimizer and processor modules to process information and provide control targets; provides a smaller traffic control unit covering a small roadway area, and covers a road segment about 1 to 2 miles (or longer or shorter distances); and contains LAN data switching system (e.g., Cisco Nexus 7000) and an engineer server (e.g. IBM engineer server Model 8203 and ORACL data base), and communicates with Point TCC either by wired or wireless communication media.

In some embodiments, the Point TCU: provides vehicle based control instructions to RSUs; collects related data from point RSUs; provides optimizer and processor modules to process information and provide control targets; and provides a smaller traffic control unit covering a short distance of a roadway (e.g., 50 meters), ramp metering, or intersections, which are installed for every ramp or intersection; and is connected with a number of RSU units, e.g., ten units (e.g., 1, 2, 3, 4, 5, 6, 7, 8, 9, 10, 12, 15, 20, etc.).

In some embodiments, the RSUs comprise one or more or all of: a sensing module that gathers traffic and related information; a data processing module that provides vehicle-specific measurements, including but not limited to speed, headway, acceleration/deceleration rate, the distance between carriageway markings and vehicles, angle of vehicles and central lines, and overall traffic status; a communication module that sends information between vehicles and upper level point TCU; a communication module that sends vehicle-specific driving instructions to vehicles; an interface module that shows data that is sent to an OBU system; and a power supply unit.

In some embodiments, a vehicle sub-system comprises one or more modules for: a) vehicle-control; b) traffic detection and data collection; c) wireless communication; and d) data collection and communication.

In some embodiments, the system is configured to redistribute essential vehicle driving tasks among vehicles comprising one or more or all of: providing instructions needed for navigation tasks to the vehicles; providing instructions and information for guidance tasks of: safety maintenance, traffic control/road condition, and special information; fulfilling vehicle maneuver tasks, and monitoring safety maintenance tasks, to take over if the system fails; providing data feeds for information exchange tasks at the control level, which is usually provided by the vehicle sensors in a vehicle; fulfilling vehicle control tasks, at the mechanic level, and monitoring surroundings, and standing-by as a backup system; providing vehicles with driving-critical information, some of which are difficult and expensive for vehicle-based sensors to obtain in a constantly reliable way; and fulfilling driving tasks and using each other as the backup in case of any errors or failures.

In some embodiments, the systems and methods comprise an in-vehicle interface selected from the group consisting of: audio: Voice control and Text-to-Voice; vision: Head-up-display (HUD); and vibration.

In some embodiments, the vehicle identification and tracking functions operate on any or any combination of: CV security certificate; on Board Unit (OBU) ID; mobile device ID; DGPS (differential GPS); vision sensors in combination with video recognition and object detection; and mobile LiDAR sensors.

In some embodiments, the systems and methods employ one or more communication systems selected from the group consisting of: OEM operators, such as OnStar; wireless communication service providers, such as ATT and Verizon; and public agencies who maintain the system, such as a DOT who owns optic fiber networks.

In some embodiments, the systems and method employ a communication technology selected from the group consisting of: wireless communication technologies, such as DSRC, Cellular 3G, 4G, 5G, Bluetooth; and cable communication technologies, such as Ethernet.

Thus, in some embodiments, provided herein are multi-dimensional connected and automated vehicle-highway systems, comprising hardware and software, said system comprising three dimensions: Dimension 1 (D1): vehicle automation of connected and automated vehicles; Dimension 2 (D2): connectivity of communication among humans, vehicles, and traffic environments; and Dimension 3 (D3): transportation system integration.

In some embodiments, D1 comprises one or more capabilities of: a) driver assistance employing a driving mode-specific execution by a driver assistance system of either steering or acceleration/deceleration using information about a driving environment and with an expectation that a human driver perform all remaining aspects of a dynamic driving task; b) partial automation employing a driving mode-specific execution by one or more driver assistance system of both steering and acceleration/deceleration using information about the driving environment and with an expectation that the human driver perform all remaining aspects of the dynamic driving task; c) conditional automation employing driving mode-specific performance by an automated driving system of all aspects of the dynamic driving task with an expectation that the human driver will respond appropriately to a request to intervene; d) high automation employing driving mode-specific performance by an automated driving system of all aspects of the dynamic driving task, even if the human driver does not respond appropriately to the request to intervene; and e) full automation employing full-time performance by an automated driving system of all aspects of the dynamic driving task under all roadway and environmental conditions that can be managed by a human driver.

In some embodiments, D2 comprises one or more capabilities of: a) information assistance, wherein a human driver receives simple traffic condition information from roadside units to assist driving and decision making; b) limited connected sensing, wherein the human driver and vehicle can access information via onboard unit and roadside units to better assist driving and decision making compared with the information assistance of a); c) redundant information sharing, wherein the human driver and vehicle can access multiple layers of information via on-board unit, roadside units, Traffic Operation Center (TOC), and vehicles, wherein vehicles are operated through various controlling strategies and methods, including human driving, vehicle automated driving, and TOC controlled driving; d) optimized connectivity, wherein information on the transportation network is not overloaded and redundant and wherein optimized information with reduced redundancy is provided to drivers and vehicles to facilitate optimized and safe driving.

In some embodiments, D3 comprises one or more capabilities of: a) key point system integration, wherein connected vehicles exchange information with roadside units at traffic key points (e.g., road intersections), obtain vehicle control instructions and other information to address local issues and keep smooth and safe traffic movement; b) segment system integration, wherein connected vehicles receive specific control instructions and information from a microscopic TOC to manage and control traffic of a specific road segment; c) corridor system integration, wherein connected vehicles receive navigation instructions from a macroscopic TOC (e.g., that manages citywide or statewide traffic) that controls the traffic volume, predicts traffic congestions, and proposes to the macroscopic TOC for global optimization; and d) macroscopic system integration, wherein a macroscopic TOC optimizes traffic distractions from a highest level to increase traffic efficiency, lower traffic costs of people and goods, and realize global optimization for a whole network.

In some embodiments, levels of system integration, automation, and connectivity, comprise: 1) Vehicle Automation Level, which uses the SAE definition; 2) Connectivity Level, which is defined based on information volume and content: (e.g., C0: No Connectivity: both vehicles and drivers do not have access to any traffic information; C1: Information assistance: vehicles and drivers can only access simple traffic information from the Internet, such as aggregated link traffic states, and information is of certain accuracy, resolution, and of noticeable delay; C2: Limited connected sensing: vehicles and drivers can access live traffic information of high accuracy and unnoticeable delay, through connection with RSUs, neighboring vehicles, and other information providers (however, the information may not be complete); C3: Redundant Information Sharing: vehicles and drivers can connect with neighboring vehicles, traffic control device, live traffic condition map, and high-resolution infrastructure map (information is with adequate accuracy and almost in real time, complete but redundant from multiple sources); and C4: Optimized connectivity: optimized information is provided and smart infrastructure can provide vehicles with optimized information feed); and 3) Transportation System Integration Level, which is defined by the levels of system coordination/optimization (e.g., S0: No integration; S1: Key point system integration, covering a small area such as intersections, ramp metering, and only for the major travel mode; S2: Segment system integration, covering a short road segment such as a freeway segment between two ramp access points, and for most of the travel modes; S3: corridor system integration, covering a corridor with connecting roads and ramps, and for all coexisting traffic modes; S4: Regional system integration, covering a city or urban area; and S5: Macroscopic system integration, covering several regions and inter-regional traffic.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

DRAWINGS

The patent or application file contains at least one drawing executed in color. Copies of this patent or patent application publication with color drawing(s) will be provided by the Office upon request and payment of the necessary fee.

FIG. 1 presents an exemplary system overview.

FIG. 2 presents an exemplary definition of a 3D CAVH (Connected Automated Vehicle Highway) system;

FIG. 3 illustrates an exemplary redistribution of driving tasks;

FIG. 4 provides a distribution of driving tasks for a typical AV (Automated Vehicle) based system;

Figure 25:
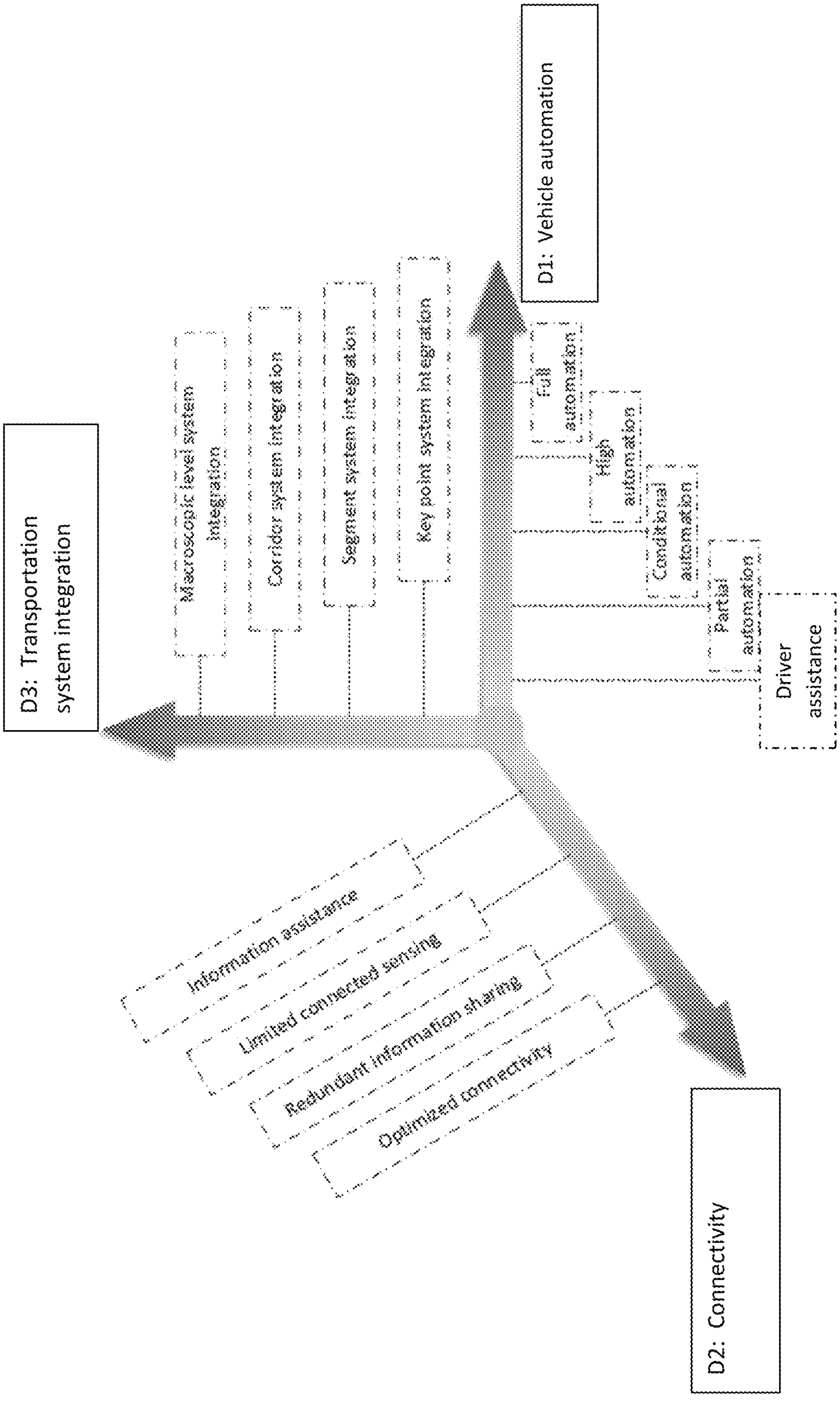

FIG. 25 presents an exemplary definition of a 3D CAVH (Connected Automated Vehicle Highway) system.

DETAILED DESCRIPTION

Exemplary embodiments of the technology are described below. It should be understood that these are illustrative embodiments and that the invention is not limited to these particular embodiments.

LEGEND

101—TCC&TCU subsystem: A hierarchy of traffic control centers (TCCs) and traffic control units (TCUs), which process information and give traffic operations instructions. TCCs are automatic or semi-automated computational centers that focus on data gathering, information processing, network optimization, and traffic control signals for regions that are larger than a short road segment. TCUs (also referred to as point TCU) are smaller traffic control units with similar functions, but covering a small freeway area, ramp metering, or intersections.

102—RSU subsystem: A network of Roadside Units (RSUs), which receive data flow from connected vehicles, detect traffic conditions, and send targeted instructions to vehicles. The RSU network focuses on data sensing, data processing, and control signal delivery. Physically, e.g. a point TCU or segment TCC can be combined or integrated with a RSU.

103—vehicle subsystem: The vehicle subsystem, comprising a mixed traffic flow of vehicles at different levels of connectivity and automation.

104—Communication subsystem: A system that provides wired/wireless communication services to some or all the entities in the systems.

105—Traffic data flow: Data flow contains traffic condition and vehicle requests from the RSU subsystem to TCC & TCU subsystem, and processed by TCC & TCU subsystem.

106—Control instructions set flow: Control instructions set calculated by TCC & TCU subsystem, which contains vehicle-based control instructions of certain scales. The control instructions set is sent to each targeted RSU in the RSU subsystem according to the RSU's location.

107—Vehicle data flow: Vehicle state data and requests from vehicle subsystem to RSU subsystem.

108—Vehicle control instruction flow: Flow contains different control instructions to each vehicle (e.g. advised speed, guidance info) in the vehicle subsystem by RSU subsystem.

301—Macroscopic Traffic Control Center: Automatic or semi-automated computational center covering several regions and inter-regional traffic control that focus on data gathering, information processing, and large-scale network traffic optimization.

302—Regional Traffic Control Center: Automatic or semi-automated computational center covering a city or urban area traffic control that focus on data gathering, information processing, urban network traffic and traffic control signals optimization.

303—Corridor Traffic Control Center: Automatic or semi-automated computational center covering a corridor with connecting roads and ramps traffic control that focus on corridor data gathering, processing, traffic entering and exiting control, and dynamic traffic guidance on freeway.

304—Segment Traffic Control Center: Automatic or semi-automated computational center covering a short road segment Traffic control that focus on segment data gathering, processing and local traffic control.

305—Point Traffic Control Unit: covering a small freeway area, ramp metering, or intersections that focus on data gathering, traffic signals control, and vehicle requests processing.

306—Road Side Unit: receive data flow from connected vehicles, detect traffic conditions, and send targeted instructions to vehicles. The RSU network focuses on data sensing, data processing, and control signal delivery.

307—Vehicle subsystem: comprising a mixed traffic flow of vehicles at different levels of connectivity and automation.

401—Macro control target, neighbor Regional TCC information.

403—Regional control target, neighbor Corridor TCC information.

405—Corridor control target, neighbor Segment TCU information.

407—Segment control target, neighbor Point TCU information.

402—Regional refined traffic conditions, metrics of providing assigned control target.

404—Corridor refined traffic conditions, metrics of providing assigned control target.

406—Segment refined traffic conditions, metrics of providing assigned control target.

408—Point refined traffic conditions, metrics of providing assigned control target.

601—Vehicle Static & Dynamic Information:

(1) Static Information
1. Vehicle ID;
2. Vehicle size info;
3. Vehicle type info (including vehicle max speed, acceleration, and deceleration);
4. Vehicle OBU info (Software information, Hardware information): Software of the OBU is designed in such a way that no user input is required and it can be seamlessly engaged with the portable RSU via Vehicle-to-Infrastructure (V2I) or Vehicle-to-Vehicle (V2V) communication, or both. The OBU hardware contains DSRC radio communication (or other communication technology) capability as well as Global Positioning System technology as compared with the RSU, which only needs to have DSRC radio communication (or other communication technology) capability.

(2) Dynamic Information
1. Timestamp;
2. Vehicle lateral/longitudinal position;
3. Vehicle speed;
4. Vehicle OD information (including origin information, destination information, route choice information);
5. Other vehicle necessary state info.

602—Vehicle control instructions:

(1) Vehicle Control Instructions
1. Lateral/Longitudinal position request at certain time;
2. Advised speed;
3. Steering and control info.

(2) Guidance Information
1. Weather;
2. Travel time/Reliability;

3. Road guidance.

701—Department of Transportation owned;

702—Communication Service Provider (CSP);

703—OEM;

801—Optimizer: Producing optimal control strategy, etc.;

802—Processor: Processing the data received from RSUs.

Figure 1:
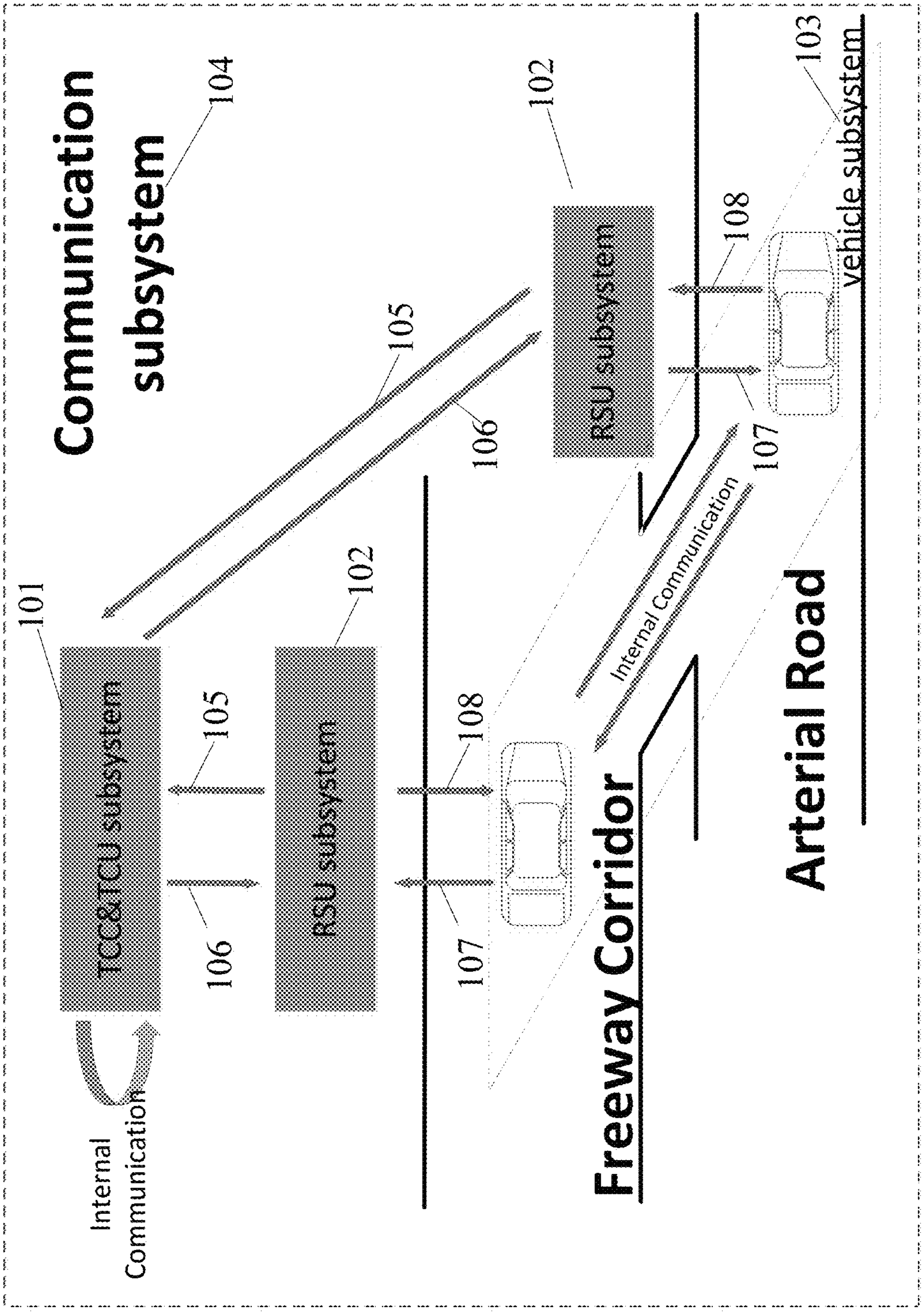

In some embodiments, as shown in FIG. 1, the system contains TCC/TCU subsystem 101, RSU subsystem 102, vehicle subsystem 103, and communication subsystem 104. TCC/TCU subsystem 101 is a hierarchical traffic control network of Traffic Control Centers (TCCs) and local traffic controller units (TCUs), which process traffic information from RSU subsystem 102 and give traffic operation instructions to RSU subsystem 102. RSU subsystem 102 is a network of Roadside Units, which process traffic detection, communication, control instructions, and emissions. Vehicle subsystem 103 is a mixed traffic flow of vehicles at different levels of connectivity and automation, which send static, dynamic information and requests of vehicles to RSU subsystem 102, and receive instructions from RSU subsystem. RSU subsystem 102 transfers vehicle data and requests from vehicle subsystem 103 into traffic information, and sends it to TCC/TCU subsystem 101 by communication system 104. TCC/TCU subsystem 101 processes the information in the proper layer and sends operation instructions back to RSU subsystem 102. RSU subsystem 102 screens and catalogues the operation instructions and sends the instructions 108 to each vehicle (e.g. advised speed, guidance information). Communication subsystem 104 is a wireless communication and security system with local and global connectivity, providing wired and wireless communication services to all the entities in the systems.

Figure 2:
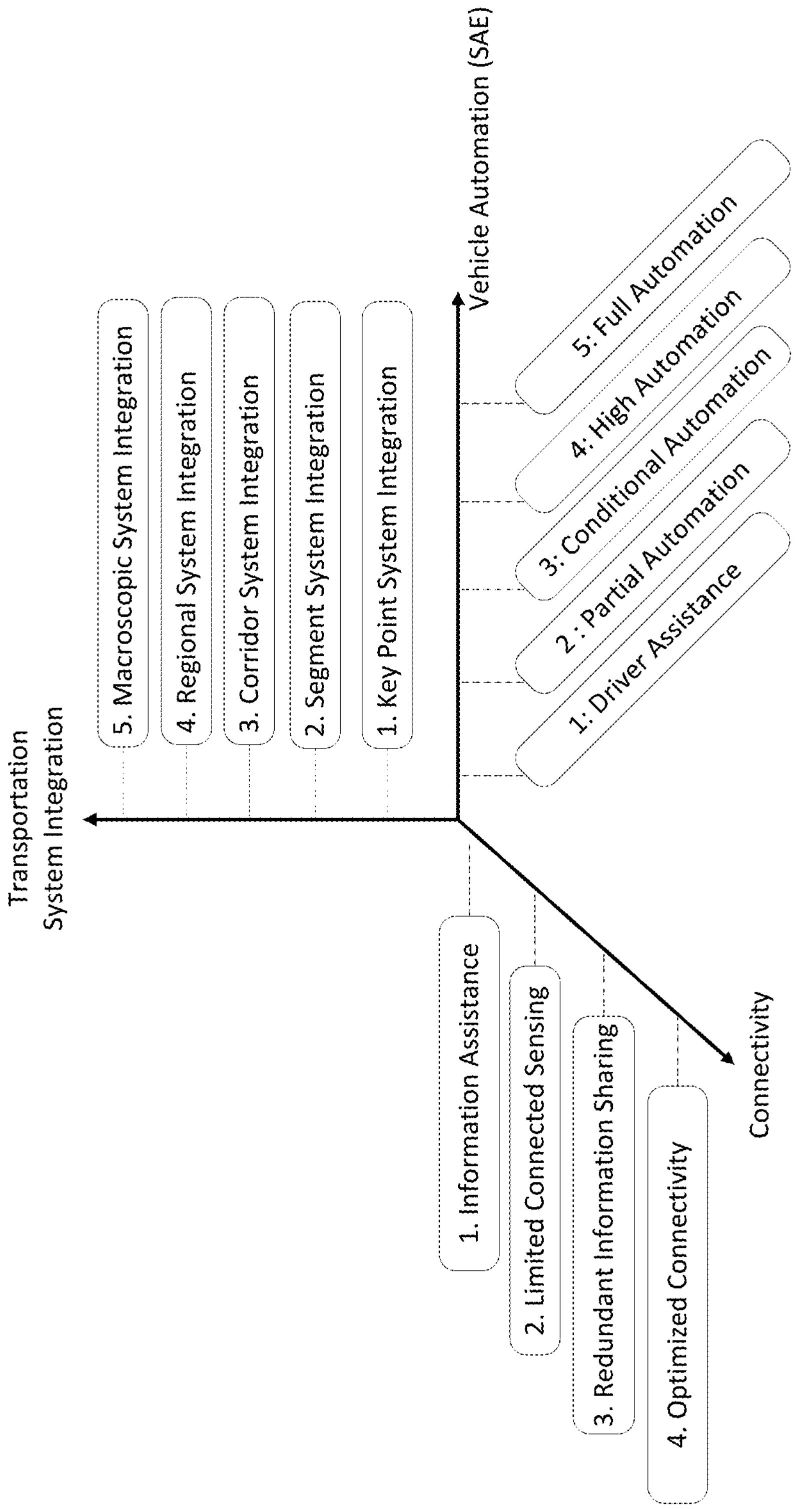

As shown in FIG. 2 (*a*), the attributes of such a system, regarding levels of system integration, automation, and connectivity, is defined as:

i. Vehicle Automation Level uses the SAE definition.

ii. Connectivity Level is defined based on information volume and content:

1. C0: No Connectivity

Both vehicles and drivers do not have access to any traffic information.

2. C1: Information Assistance

Vehicles and drivers can only access simple traffic information from the Internet, such as aggregated link traffic states. Information is of certain accuracy, resolution, and of noticeable delay.

3. C2: Limited Connected Sensing

Vehicles and drivers can access live traffic information of high accuracy and unnoticeable delay, through connection with RSUs, neighbor vehicles, and other information providers. However, the information may not be complete.

4. C3: Redundant Information Sharing

Vehicles and drivers can connect with neighbor vehicles, traffic control device, live traffic condition map, and high-resolution infrastructure map. Information is with adequate accuracy and almost in real time, complete but redundant from multiple sources.

5. C4: Optimized Connectivity

Vehicles and drivers are provided with optimized information. Smart infrastructure can provide vehicles with optimized information feed.

iii. System Integration Level is defined based on coordination/optimization scope:

1. S0: No Integration

There is no integration between any systems.

2. S1: Key Point System Integration (e.g., RSU based control for intersections, ramp metering)

System integration occurs at intersection or ramp metering area. However, coordination/optimization scope is very small.

3. S2: Segment System Integration (e.g., optimizing traffic on University Ave. within the campus)

Scope becomes larger and more RSUs and vehicles are involved in the coordination and optimization. The traffic modes will remain the same.

4. S3: Corridor System Integration (e.g., highway and local street integration, across different traffic modes)

Coordination and optimization will cross different traffic modes and a whole freeway or arterial will be considered. RSUs and vehicles by share the information with each other will achieve system optimal in target scope.

5. S4: Macroscopic System Integration (e.g., city or statewide) City or statewide coordination and optimization is achieved by connecting RSUs and vehicles in very large scope.

Unless specified otherwise, any of the embodiments described herein may be configured to operate with one or more of the Connectivity Levels in each combination with one or more of the System Integration Levels.

For example, in some embodiments, provided herein is a three-dimensional connected and automated vehicle-highway system (see e.g., FIG. 25). The exemplary system in FIG. 25 includes three dimensions: Dimension 1 (D1): vehicle automation, defines the development stages of connected and automated vehicles, adopting the SAE vehicle automation definition (e.g., driver assistance, partial automation, conditional automation, high automation, and full automation). Dimension 2 (D2): connectivity, defines the development stages of communication technologies, is about the communication among human, vehicles, and the traffic environment (e.g., information assistance, limited connected sensing, redundant information sharing, and optimized connectivity). Dimension 3 (D3): transportation system integration, defines the development stages of transportation system (e.g., key point system integration, segment system integration, corridor system integration, and macroscopic level system integration). This system provides a comprehensive system for the connected and automated vehicles and highways, by integrating, coordinating, controlling, managing, and optimizing all related vehicles, information services, facilities, and systems.

Figure 3:
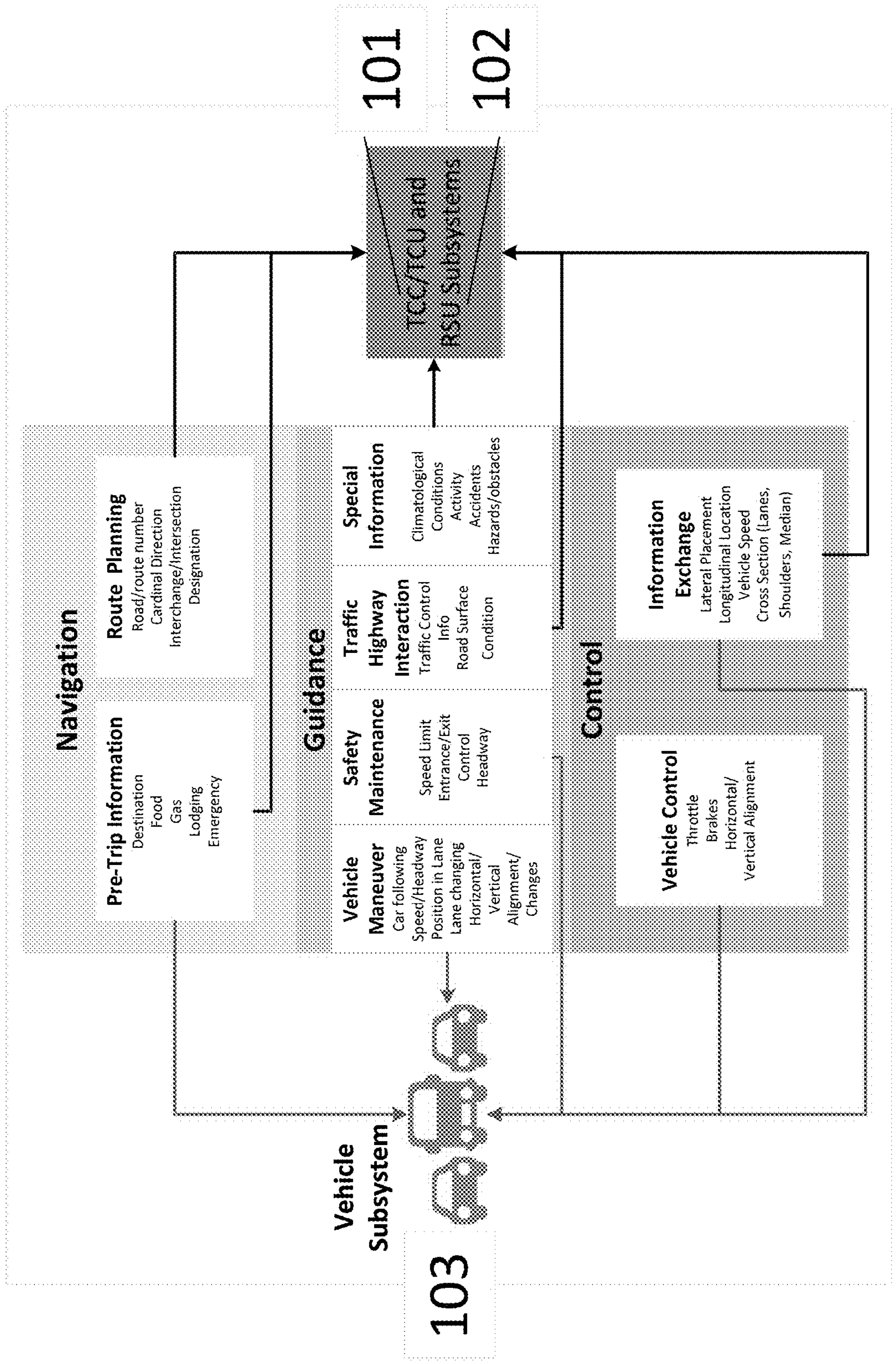

FIG. 3 shows (1) all the driving tasks among the originally defined three broad levels of performance: “Control”, “Guidance”, and “Navigation”, according to the original definition of driving task by Lunenfeld and Alexander in 1990 (A User’s Guide to Positive Guidance (3rd Edition) FHWA SA-90-017, Federal Highway Administration, Washington, DC). Those driving tasks are essential for all vehicles to drive safely from origins to destinations, and (2) how those tasks are distributed into and covered by the Vehicle Subsystem 103 and TCC/TCU 101+RSU 102 subsystems. In the “Navigation” level, the TCC/TCU 101+RSU 102 subsystems provide the instructions to the vehicles, including the “Pre-trip information” and “Route planning” needed for vehicles. In the “Guidance” level, the TCC/TCU 101+RSU 102 subsystems provide the instructions and information for the Guidance tasks: Traffic Control/Road Condition, and Special Information. The Vehicle subsystem 103 fulfills the Vehicle Maneuver tasks, and monitors the Safety Maintenance tasks in addition to the operation of the TCC/TCU 101+RSU 102. In the "Control" level, the TCC/TCU 101+ RSU 102 subsystems provide data needs for the Information Exchange tasks. At the same time, the vehicle subsystem 103 fulfills Vehicle Control tasks, at the mechanic level, and monitors the surroundings, standing-by as the backup system.

Figure 4:
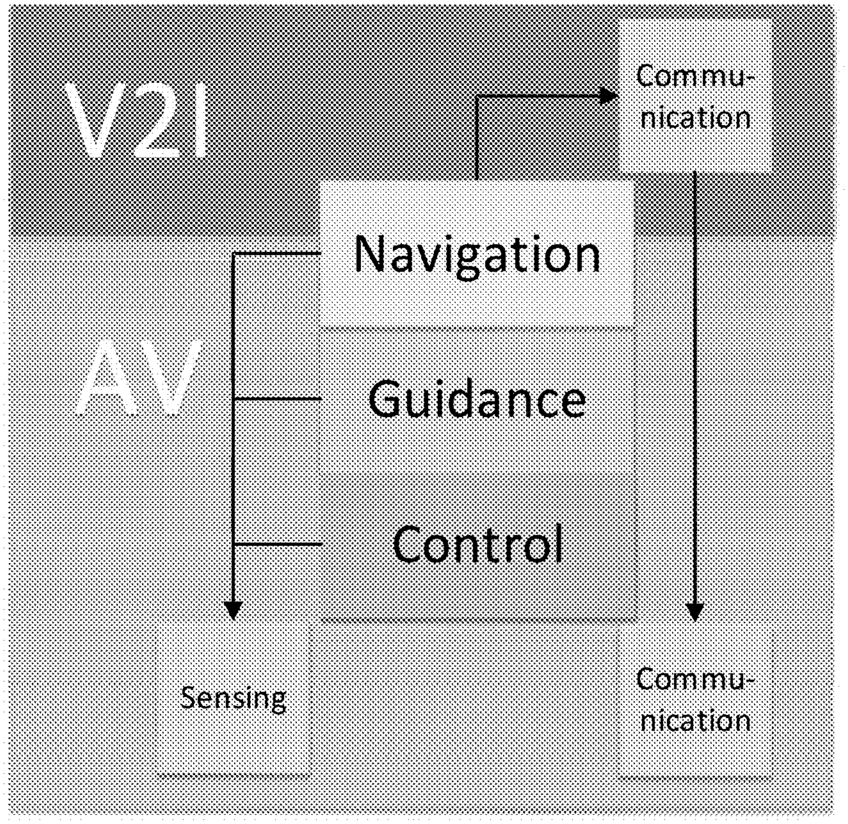

FIG. 4 shows the driving tasks distribution for the typical traditional Automated Vehicle (AV) based system solution. The Automated Vehicle, with the support of sensing technology like radars, cameras, etc., takes over most of the driving tasks among three levels while the "Vehicle-to-infrastructure" (V2I) technology provides support mostly in the "Navigation" level. The V2I typically uses communication technology like Dedicated Short Range Communications (DSRC) to fulfill its command and information exchange intentions. However, the traditional V2I technology has limitations. One of the major issue is that it contains only a single point-of-failure, which means that whenever the server or the link to the server fails, the system will fail immediately. The failure will lead to the loss of data, and endanger the whole system.

Figure 5:
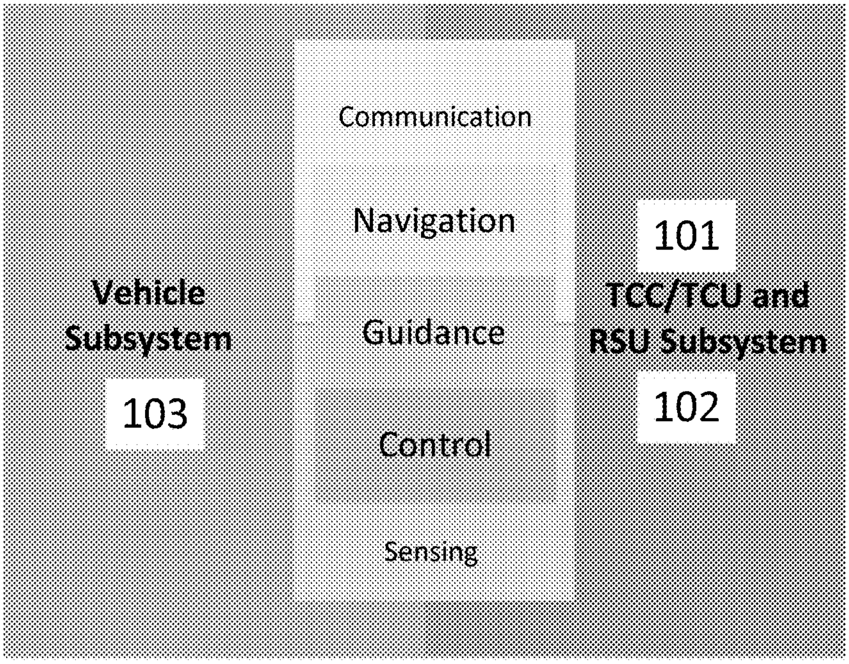
FIG. 5 illustrates an exemplary distribution of driving tasks in an embodiment of the technology provided herein.

FIG. 5 shows the driving tasks distribution of embodiments of the present system. The Vehicle Subsystem 103, together with the TCC/TCU 101 and RSU 102 Subsystem, takes over all the driving tasks among the three performance levels. The sensing and communication technology is used both by Vehicle Subsystem 103 and the TCC/TCU 101 and RSU 102 Subsystem to support the present system. The sensing serves in the level of both "Control" and "Guidance" while the communication serves in the "Navigation" and "Guidance" Levels. The collaboration of the Vehicle subsystem 103, together with the TCC/TCU 101 and RSU 102 subsystem brings the system a redundancy, which provides the system the benefits of safety, reliability and cost effectiveness. Specifically, the dual-security system provides a fail-safe mechanism. When one of the subsystems fails, the others ensure the entire system working properly.

Figure 6:
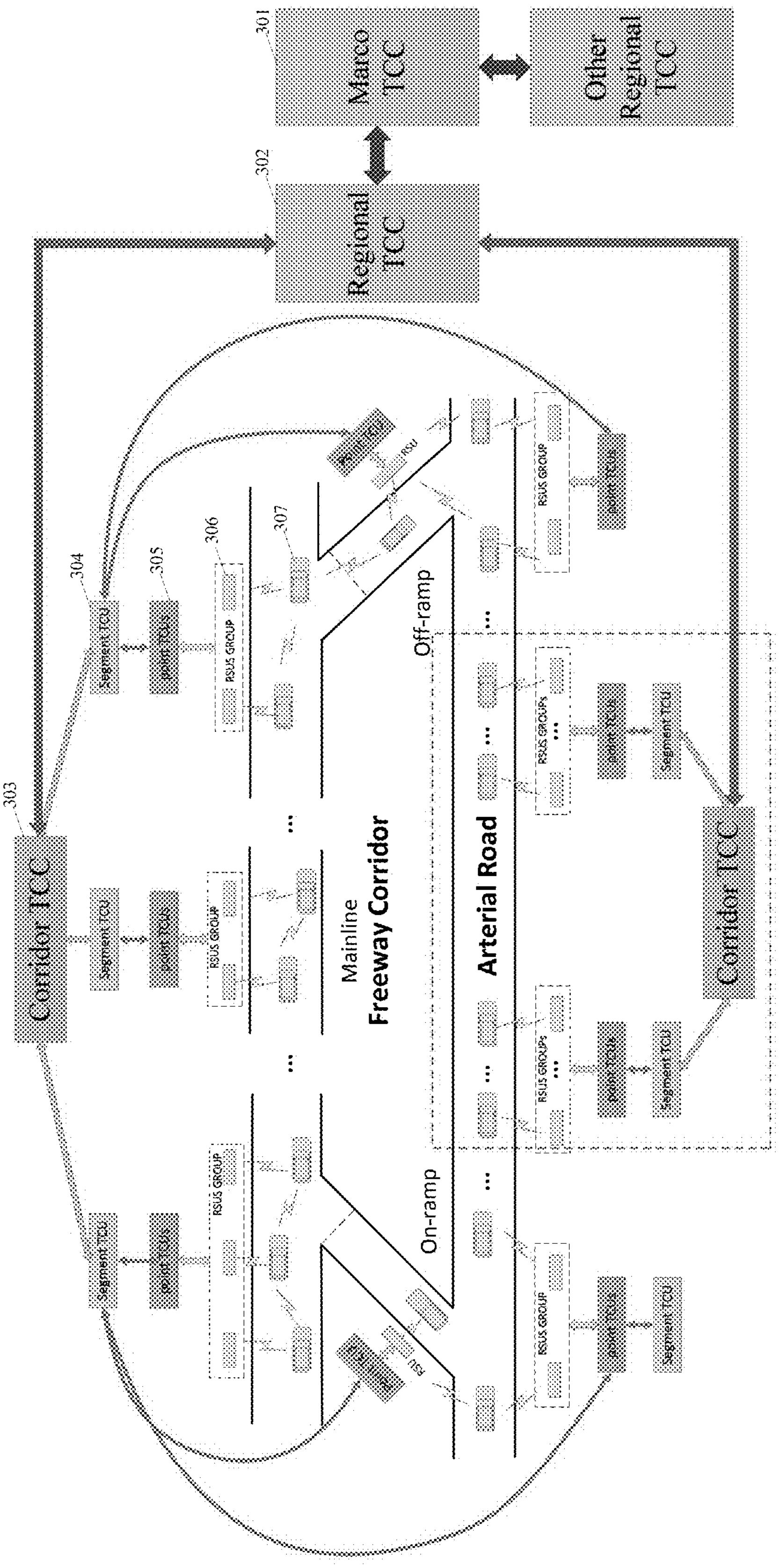
FIG. 6 illustrates exemplary system components.

As shown in FIG. 6, the Fully-Controlled Connected Automated Vehicle Highway System contains components listed as follows: The Macroscopic Traffic Control Center (Marco TCC) 301, which is automatic or semi-automated computational center covering several regions and inter-regional traffic control that focus on data gathering, information processing, and large-scale network traffic optimization. The Regional Traffic Control Center (Regional TCC) 302, which is automatic or semi-automated computational center covering a city or urban area traffic control that focus on data gathering, information processing, urban network traffic control optimization. The Corridor Traffic Control Center (Corridor TCC) 303, which is automatic or semi-automated computational center covering a corridor with connecting roads and ramps traffic control that focus on corridor data gathering, processing, traffic entering and exiting control, and dynamic traffic guidance on freeway. The Segment Traffic Control Unit (Segment TCU) 304, which is a local automatic or semi-automated control unit covering a short road segment traffic control that focus on segment data gathering, processing and local traffic control. Point Traffic Control Unit (Point TCU) 305, which is an automatic control unit covering a small freeway area, ramp metering, or intersections that focus on data gathering, traffic signals control, and vehicle requests processing. The Marco TCC 301, Regional TCC 302, Corridor TCC 303, Segment TCU 304 and Point TCU 305 are the components of TCC/TCU subsystem 101. The Road Side Units (RSU 306), which represents small control units that receive data and requests from connected vehicles, detect traffic state, and send instructions to targeted vehicles. The network comprising RSUs 306 is the RSU subsystem 303, which focuses on data sensing, data processing, and control signal delivery. The connected and automated vehicles 307 is the basic element of vehicle subsystem 304, including vehicles at different levels of connectivity and automation. OBU (On-Board Unit with sensor and V2I communication units) network is embedded in connected and automated vehicles 307.

Figure 7:
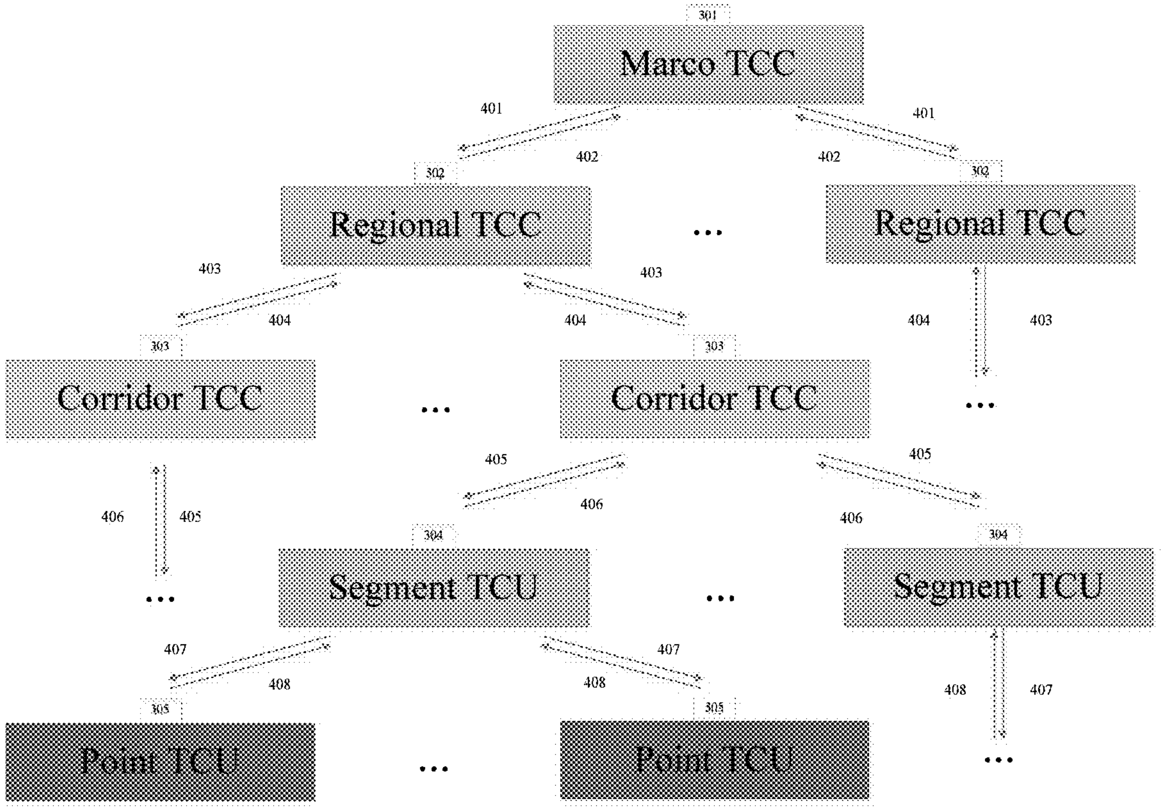
FIG. 7 illustrates an exemplary TCU (Traffic Control Unit) subsystem.

As shown in FIG. 7, the top level macroscopic traffic control center (TCC) 301 sends control target such as regional traffic control and boundary information 401 to second level regional TCC 302. At the same time, regional TCC 302 sends refined traffic conditions 402 such as congestion condition back to macro TCC 301, which helps macro TCC 301 to deal with large-scale network traffic optimization. Similar processes are carried out between every two consecutive levels. Regional TCC 302 sends control target and boundary information 403 to corridor TCC 303 and receives refined traffic condition 404. Corridor TCC 303 sends control target and boundary information 405 to segment traffic control unit (TCU) 304 and receives refined traffic condition 406. Segment TCU 304 sends control target and boundary information 407 to point TCUs 305 and receives point TCUs' 305 refined traffic conditions 408.

Figure 8:
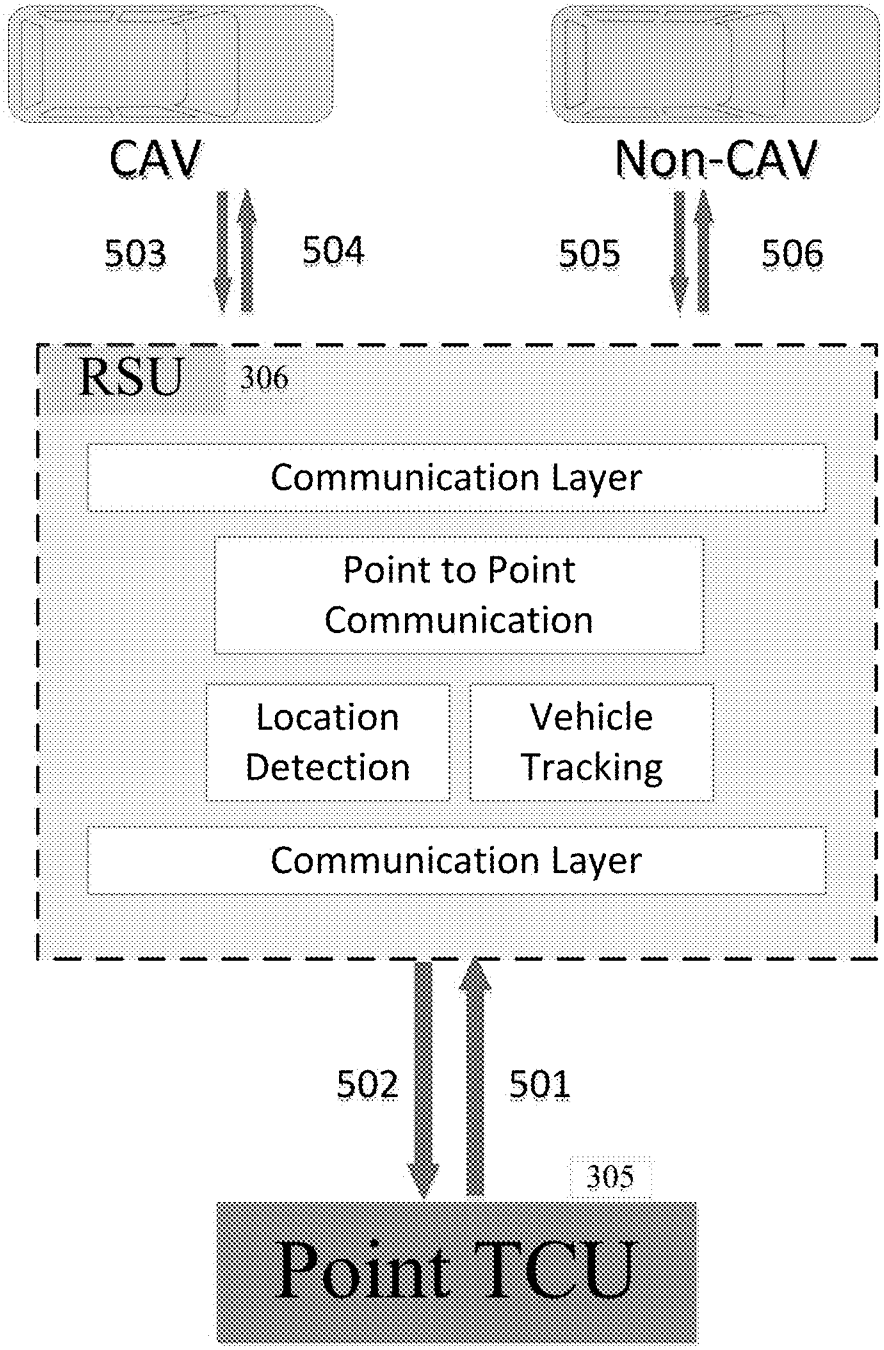
FIG. 8 illustrates an exemplary RSU (Road Side Unit) subsystem.

As shown in FIG. 8, Road side unit group 306 receives data from CAV and Non-CAV and detects traffic conditions. Then, Road side unit group 306 sends data to point traffic control unit 305. After receiving all data from the Road side unit group 306 that is located in the covering area, point traffic control unit 305 optimizes traffic control strategy for all area and sends targeted instructions to Road side unit group 306.

Figure 9:
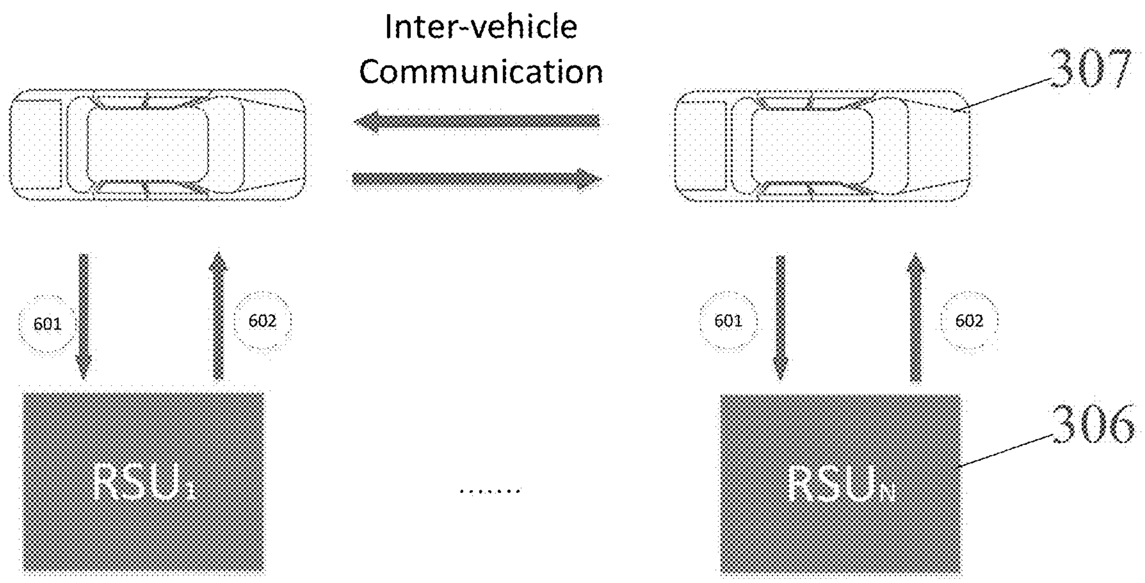
FIG. 9 illustrates exemplary vehicle subsystem data flow.

As shown in FIG. 9, road side unit group 306 receives data from connected vehicles 307, detects traffic conditions, and sends targeted instructions to vehicles 307. The RSU network focuses on data sensing, data processing, and control signal delivering. Information is also shared by different vehicles 307 that have communication with each other. Vehicles 307 also is a subsystem that can comprise a mixed traffic flow of vehicles at different levels of connectivity and automation.

Figure 10:
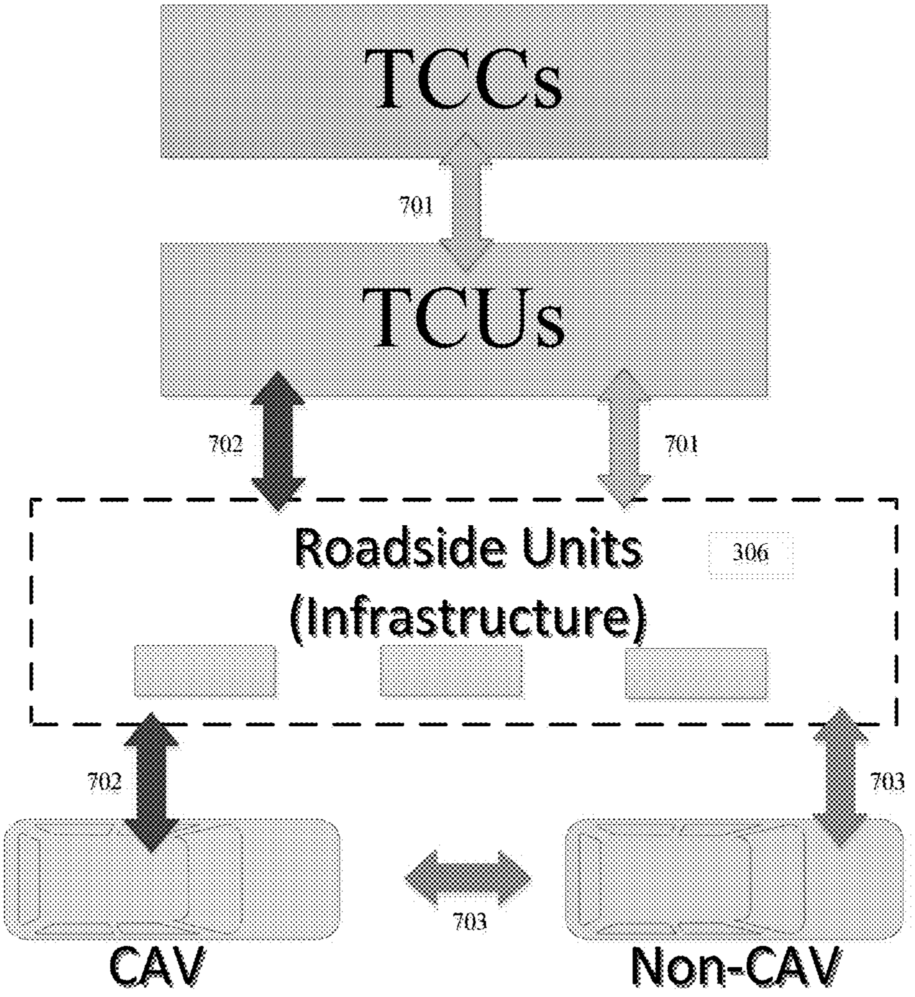
FIG. 10 illustrates an exemplary communication subsystem.

As shown in FIG. 10, Department of Transportation 701 controls the communication information between traffic control centers (TCC) and traffic control units (TCU). The information between TCUs and roadside units (RSU) is shared with Department of Transportation 701 and communication service provider 702. The communication service provider 702 also controls data between roadside units and connected automated vehicle (CAV). The communication between non-CAV and CAV, and between RSU and non-CAV, is controlled by OEM 703.

Figure 11:
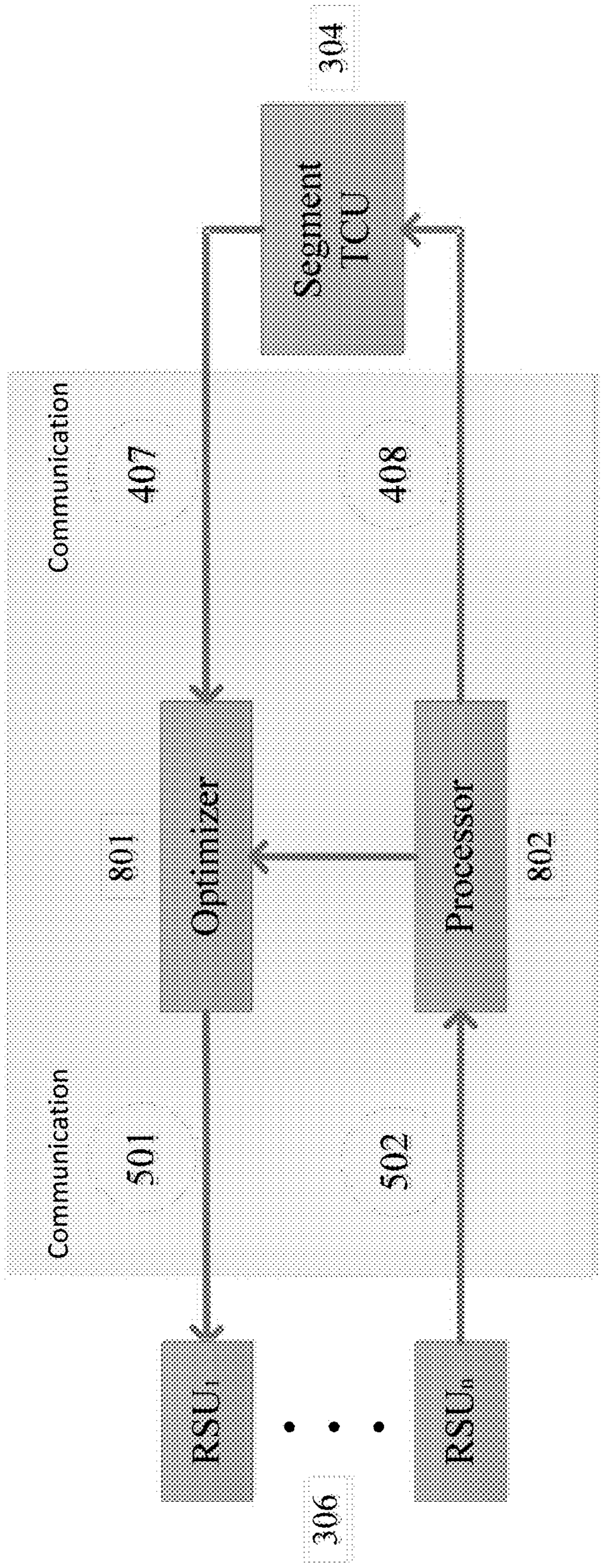
FIG. 11 illustrates an exemplary point TCU.

As shown in FIG. 11, RSU 306 collects traffic data from highway and passes the traffic information 502 to optimizer 801 and processor 802. After receiving data, processor 802 processes it and generates current traffic conditions 408, which is delivered to Segment TCC 304. Segment TCC 304 decides the control target 407 to be controlled and informs optimizer 801 about it. Optimizer 801 optimizes the plan based on traffic information 502 and control target 407 and returns the vehicle-based control instructions 501 to RSU 306.

Figure 12:
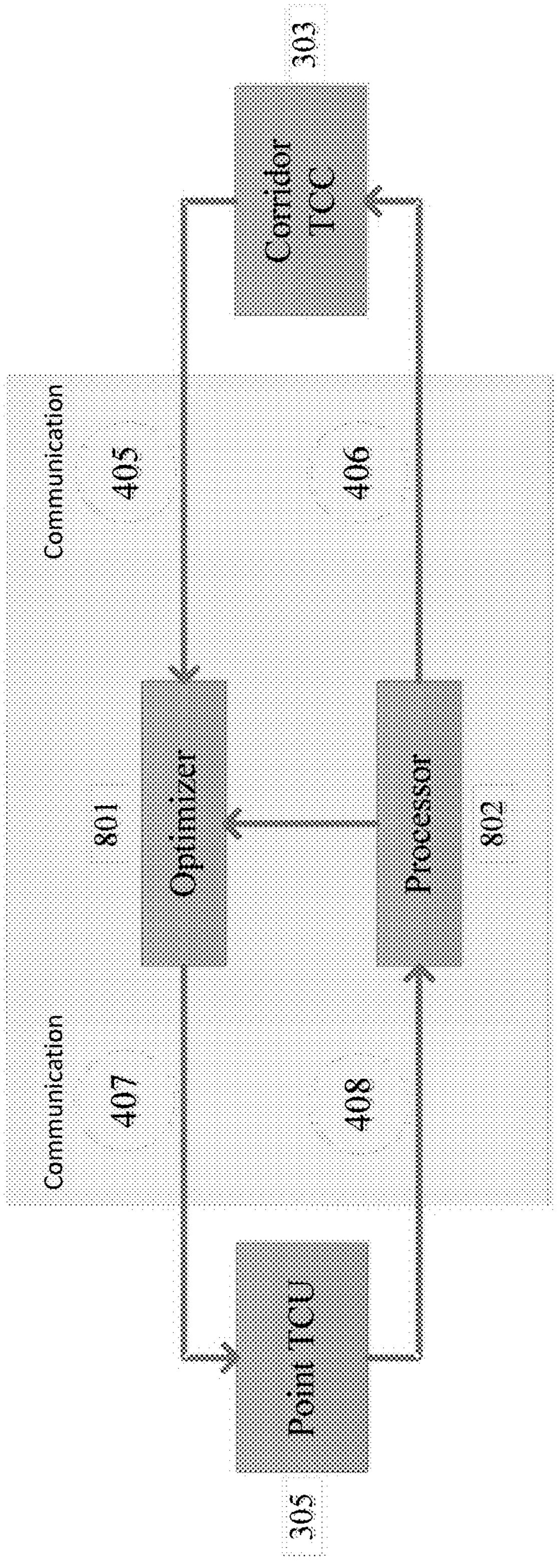
FIG. 12 illustrates an exemplary segment TCU.

As shown in FIG. 12, Point TCU 305 generates current traffic conditions 408 and passes them to optimizer 801 and processor 802. After receiving the condition information, processor 802 processes it and generates current segment traffic conditions 406, which is delivered to Corridor TCC 303. Corridor TCC 303 decides the control target 405 to be controlled and informs optimizer 801 about it. Optimizer 801 optimizes the plan based on traffic conditions 408 and control target 405 and returns control target 407 for Point TCU 305.

Figure 13:
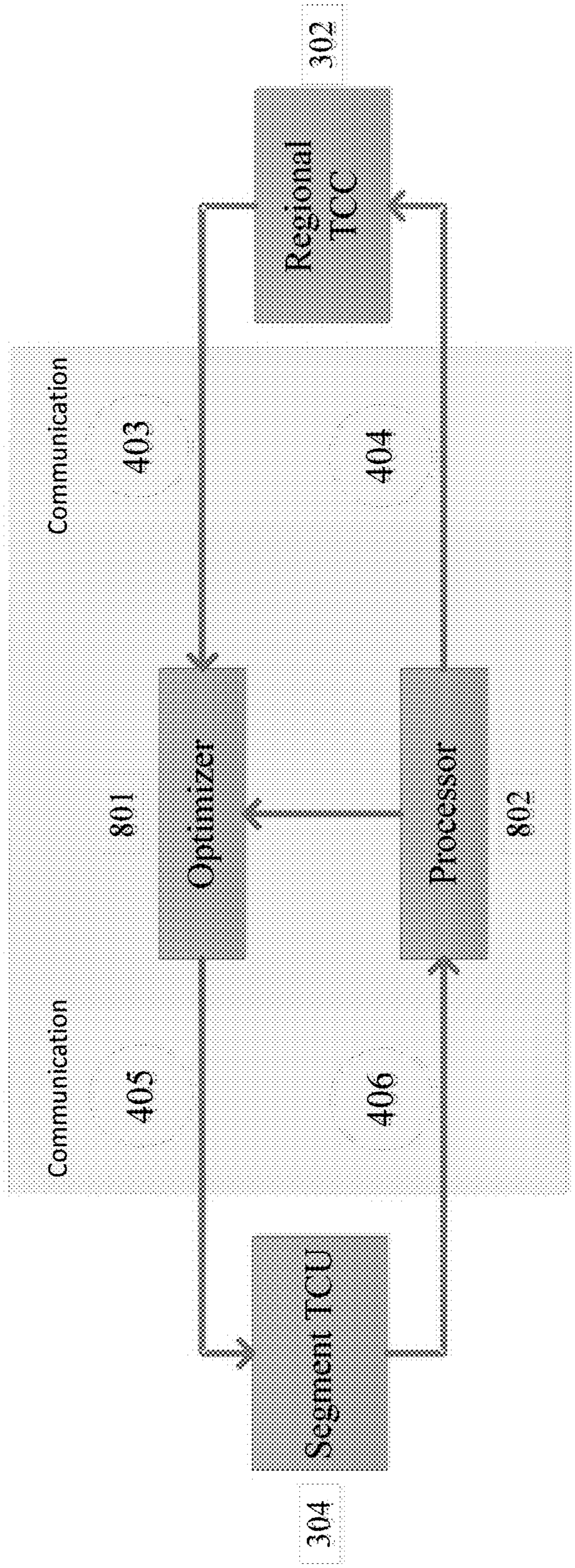
FIG. 13 illustrates an exemplary corridor TCU.

As shown in FIG. 13, Segment TCU 304 generates current segment traffic conditions 406 and passes them to optimizer 801 and processor 802. After receiving the condition information, processor 802 processes it and generates current corridor traffic conditions 404, which is delivered to Regional TCC 302. Regional TCC 302 decides the control target 403 to be controlled and informs optimizer 801 about it. Optimizer 801 optimizes the plan based on segment traffic conditions 406 and control target 403 and returns control target 405 for Segment TCU 304.

Figure 14:
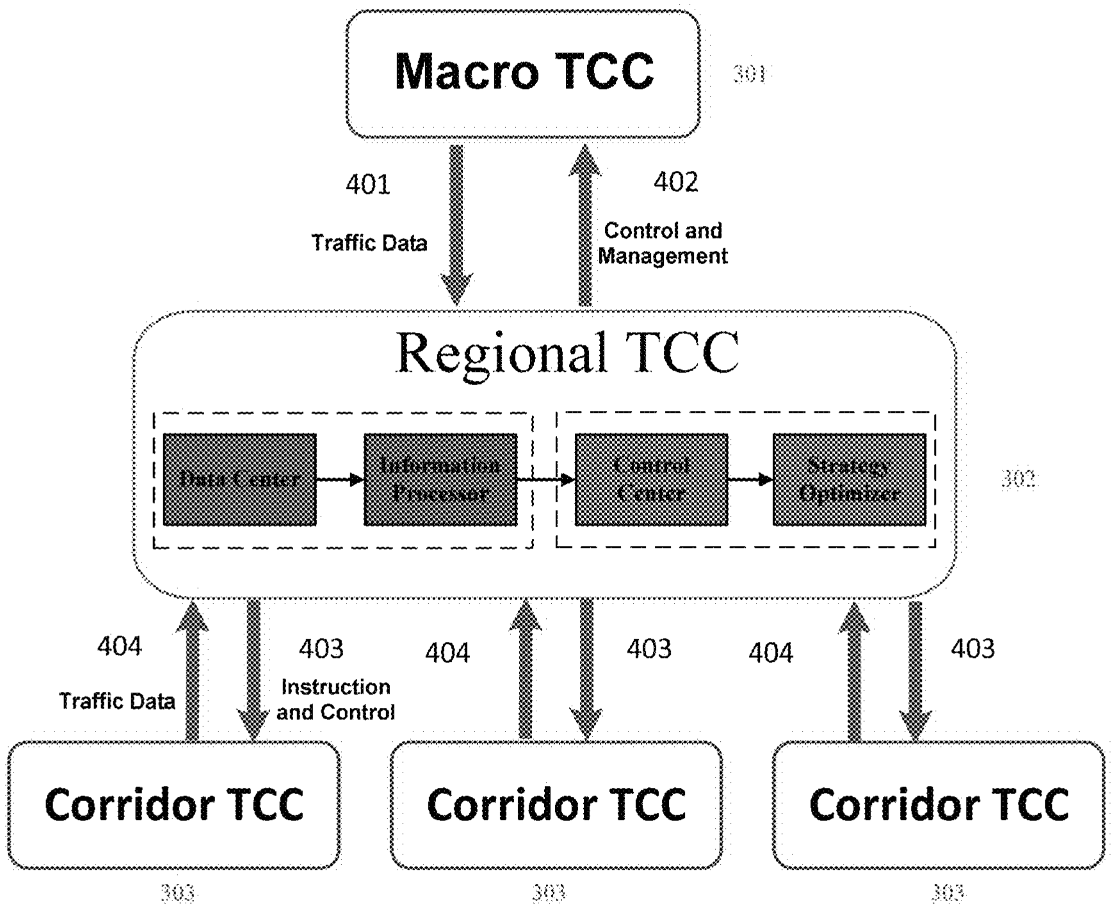
FIG. 14 illustrates an exemplary regional TCU.

FIG. 14 shows the data and decision flow of Regional TCC 302. Each Corridor TCC 303 collectively sends all the traffic data to the Regional TCC 302. After the data is received by the data center, all the data is processed by the information processor. The information processor integrates traffic data and sends it to the control center. The control center makes draft-decision by a preset algorithm and sends the result to strategy optimizer. The optimizer simulates the decision and optimizes it and sends it to both Corridor TCC 303 and Macro TCC 301. Macro TCC 301 shares traffic data from other Regional TCCs 302 nearby and system optimized decision back to the Regional TCC 302.

Figure 15:
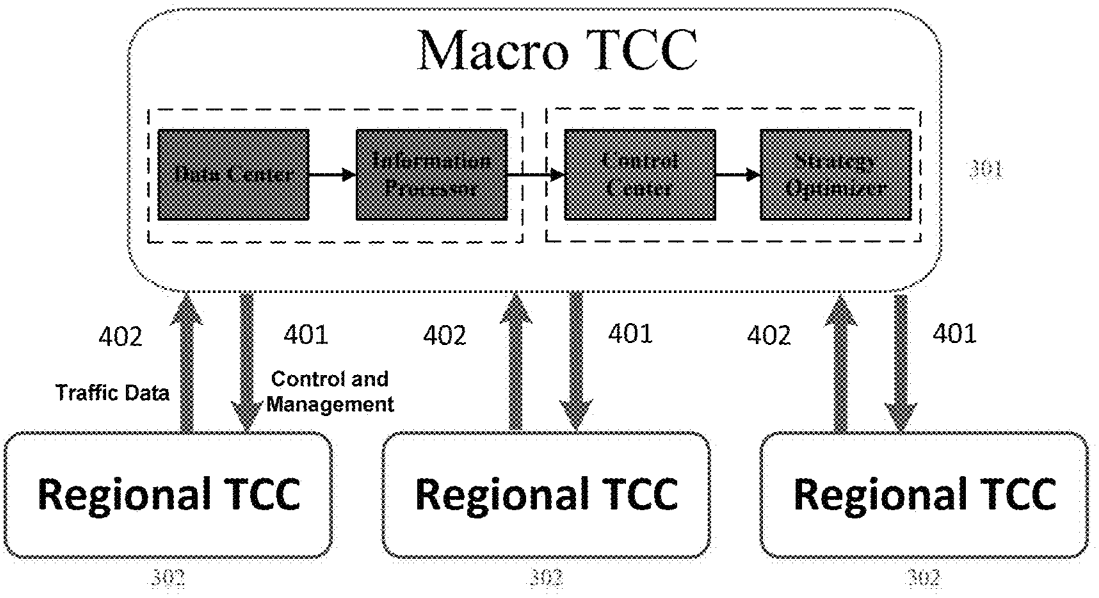
FIG. 15 illustrates an exemplary macroscopic TCC (Traffic Control Center)

As shown in FIG. 15, each Regional TCC 302 sends the traffic data and local optimized strategy to the Macro TCC 301. An information processor integrates all optimized strategies and traffic data. After that, the control center makes a draft-decision based on the traffic data from Regional TCCs 303. The draft-decision is then processed by the strategy optimizer. A final system-optimized decision is made and sent back to the Regional TCCs 303.

Figure 16:
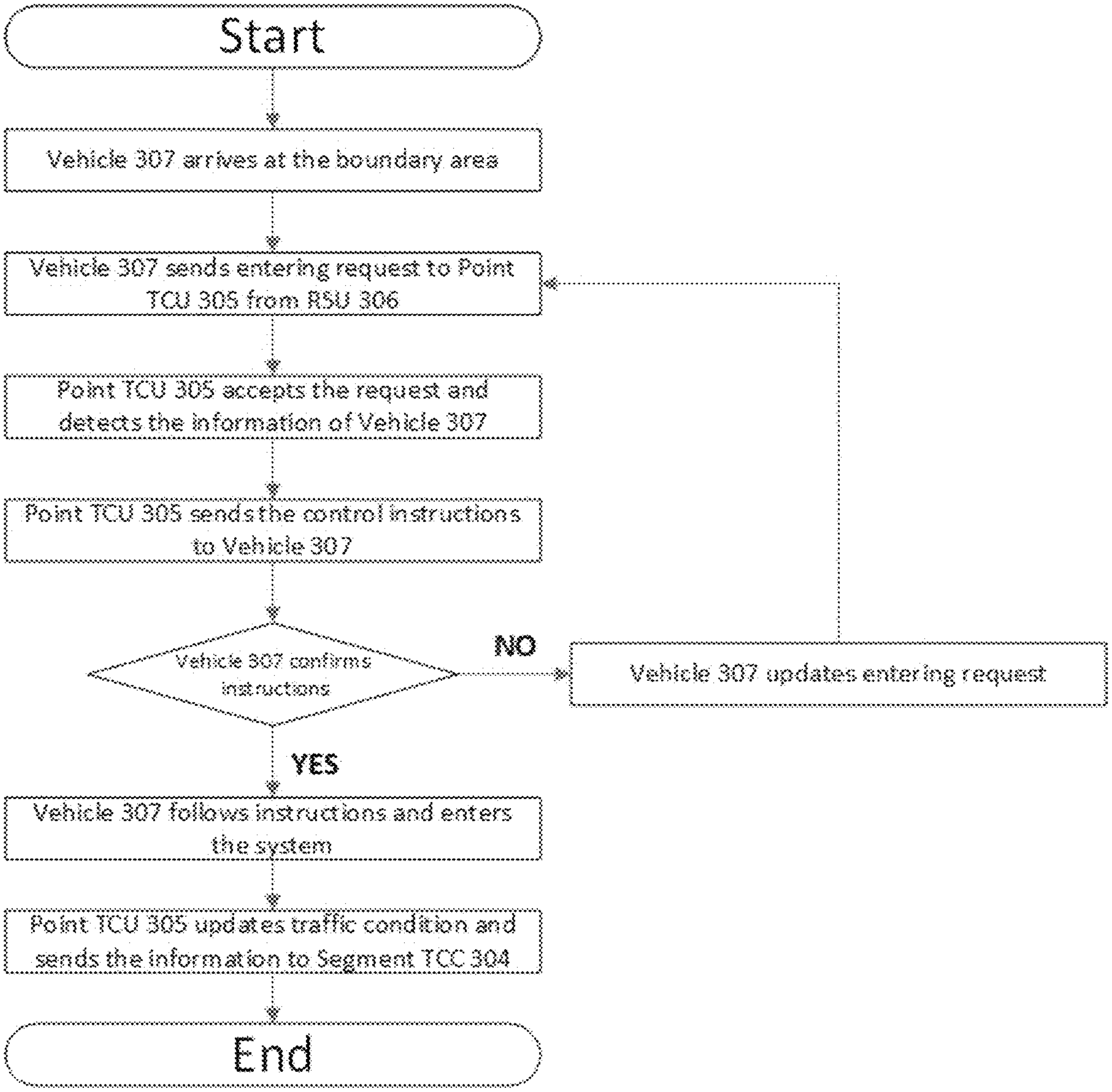
FIG. 16 illustrates an exemplary vehicle entering control.

FIG. 16 illustrates the process of vehicles 307 entering the fully-controlled system. As shown in FIG. 16, vehicles 307 send the entering requests to RSUs 306 after arriving at the boundary area of the system. The boundary area refers to the area around the margin of a Segment TCU's 304 control range. RSUs 306 provide the entering requests to Point TCUs 305 and detect the information of vehicles 307, including static and dynamic vehicle information 6.2, after Point TCUs 305 accept the entering requests. Point TCUs 305 formulate the control instructions 6.1 (such as advised speed, entering time, entering position, etc.) for vehicles 307 to enter the fully-controlled system and attempt to take over the control of vehicles 307, based on the information detected by RSUs 306. Vehicles 307 receive the control instructions 6.1 from RSUs 306 and process the instructions 6.1 with the inner subsystems to decide whether the instructions 6.1 can be confirmed. Vehicles 307 update and send the entering requests again if the control instructions 6.1 cannot be confirmed based on the judgment of the inner subsystems. Vehicles 307 drive following the control instructions 6.1 and enter the fully-control system if the control instructions 6.1 are confirmed. Point TCUs 305 take over the driving control of vehicles 307, and vehicles 307 keep driving based on the control instructions 6.1 provided from the fully-controlled system. Point TCUs 305 update the traffic condition and send the refined information 4.8 to the Segment TCU 304 after vehicles 307 enter the fully-controlled system.

Figure 17:
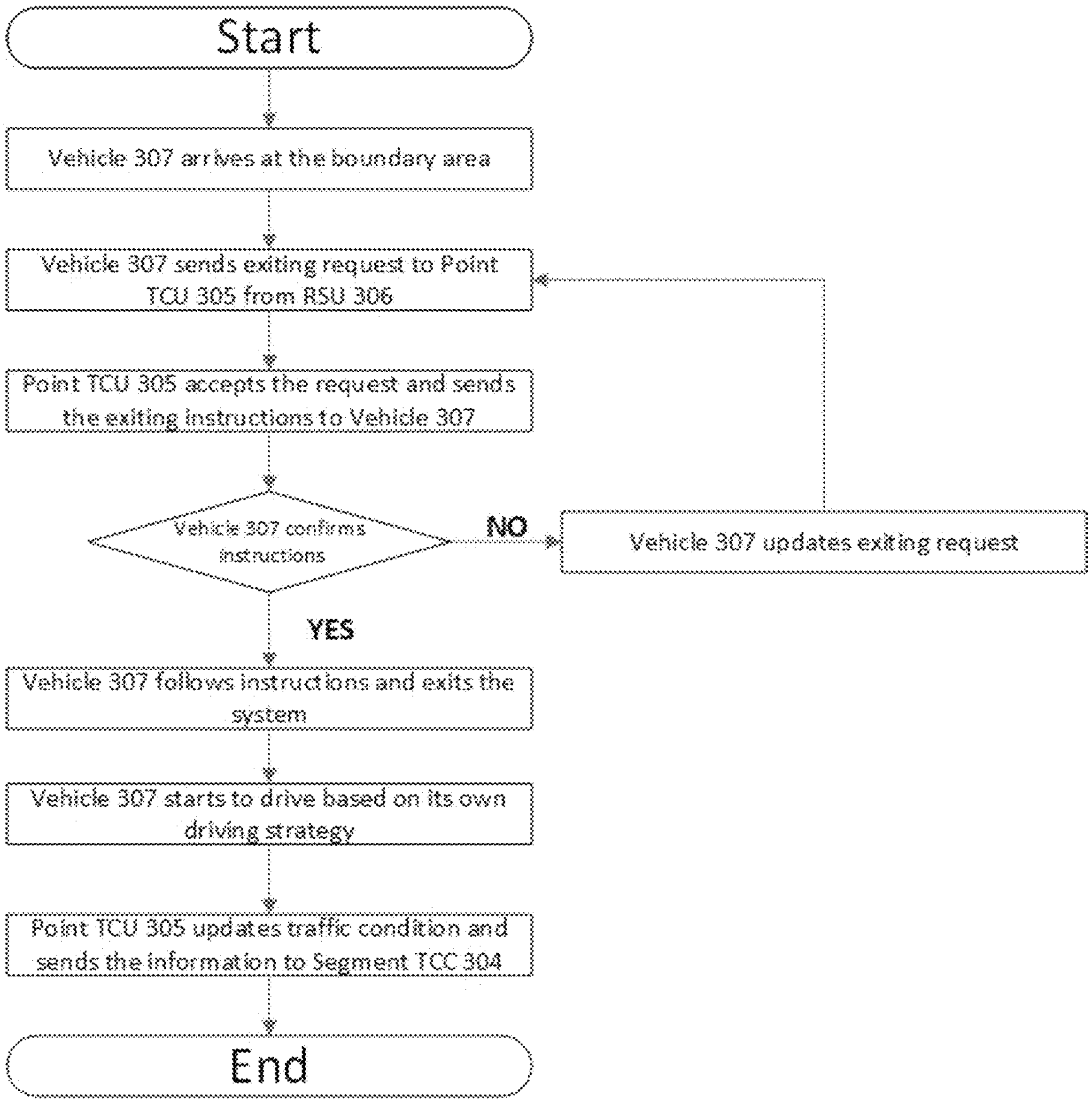
FIG. 17 illustrates an exemplary vehicle exit control.

FIG. 17 illustrates the process of vehicles 307 exiting the fully-controlled system. As shown in FIG. 17, vehicles 307 send the exiting requests to RSUs 306 after arriving at the boundary area of the system. The boundary area refers to the area around the margin of a Segment TCU's 304 control range. RSUs 306 provide the exiting requests to Point TCUs 305. Point TCUs 305 formulate the exiting instructions 6.1 (such as advised speed, exiting time, exiting position, etc.) for vehicles 307 to exit the fully-controlled system based on the information detected by RSUs 306. Vehicles 307 receive the exiting instructions 6.1 from RSUs 306 and process the instructions 6.1 with the inner subsystems to decide whether the instructions 6.1 can be confirmed. Vehicles 307 update and send the entering requests again if the exiting instructions 6.1 can't be confirmed based on the judgment of the inner subsystems. Vehicles 307 drive following the exiting instructions 6.1 and exit the fully-control system if the exiting instructions 6.1 are confirmed. Point TCUs 305 terminate the driving control of vehicles 307, and vehicles 307 start the autonomous driving and follow their own drive strategies after conducting the exiting constructions. Point TCUs 305 update the traffic condition and send the refined information 4.8 to the Segment TCU 304 after vehicles 307 exit the fully-controlled system.

Example

The following example provides one implementation of an embodiment of the systems and methods of the technology herein, designed for a freeway corridor.

1. RSU

RSU Module Design

Figure 18:
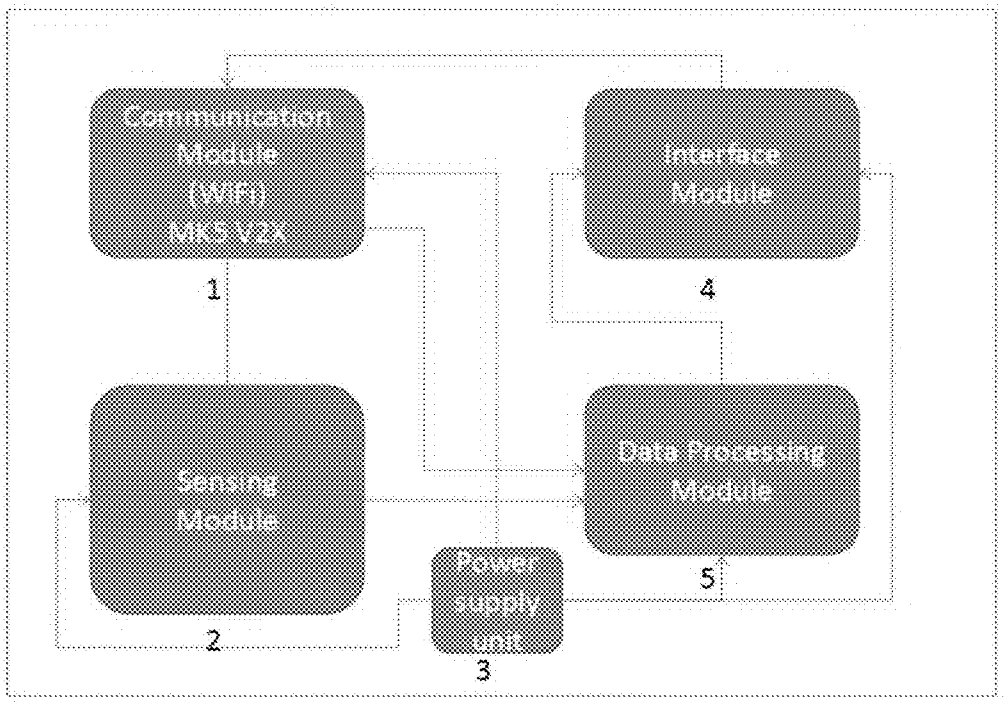
FIG. 18 illustrates an exemplary RSU Module Design.

As shown in FIG. 18, a RSU has two primary functions: 1) communication with vehicles and point traffic control units (TCUs), and 2) collecting traffic and vehicle driving environmental information. The sensing module (2) gathers information using various detectors described in detail in the following sections. The data processing module (5) uses data fusion technology to obtain six major feature parameters, namely speed, headway, acceleration/deceleration rates, the distance between carriageway markings and vehicles, angle of vehicles and central lines, and overall traffic status. Meanwhile, the communication module (1) also sends information received from vehicles and point TCUs to the data processing module (5) to update the result of the module. After six feature parameters are generated, the communication module (1) sends driving instructions to the OBU system installed on an individual vehicle, and shares the information with point TCUs. The interface module (4) will show the data that is sent to the OBU system. The power supply unit (3) keeps the power to maintain the whole system working.

Communication Module

Communication with Vehicles

Hardware Technical Specifications:

- Standard Conformance: IEEE 802.11p—2010
- Bandwidth: 10 MHz
- Data Rates: 10 Mbps
- Antenna Diversity CDD Transmit Diversity
- Environmental Operating Ranges: −40° C. to +55° C.
- Frequency Band: 5 GHz
- Doppler Spread: 800 km/h
- Delay Spread: 1500 ns
- Power Supply: 12/24V Exemplary on-market components that may be employed are:

A. MK5 V2X from Cohda Wireless (http://cohdawireless.com)

B. StreetWAVE from Savari (http://savari.net/technology/road-side-unit/)

Communication with Point TCUs

Hardware Technical Specifications:

Standard Conformance: ANSI/TIA/EIA-492AAAA and 492AAAB

Optical fiber

Environmental Operating Ranges: −40° C. to +55° C.

Exemplary on-market components that may be employed are: Optical Fiber from Cablesys https://www.cablesys.com/fiber-patch-cables/?gclid=Cj0KEQjwldzHBRCfg_aImKrf7N4BEiQABJTPKH_q2wbjNLGBhBVQVSBogLQMkDaQdMm5rZtyBaE8uuUaAhTJ8P8HAQ Sensing Module Six feature parameters are detected.

Speed

Description: Speed of individual vehicle

Frequency: 5 Hz

Error: less than 5 mile/h with 99% confidence

Headway

Figure 19:
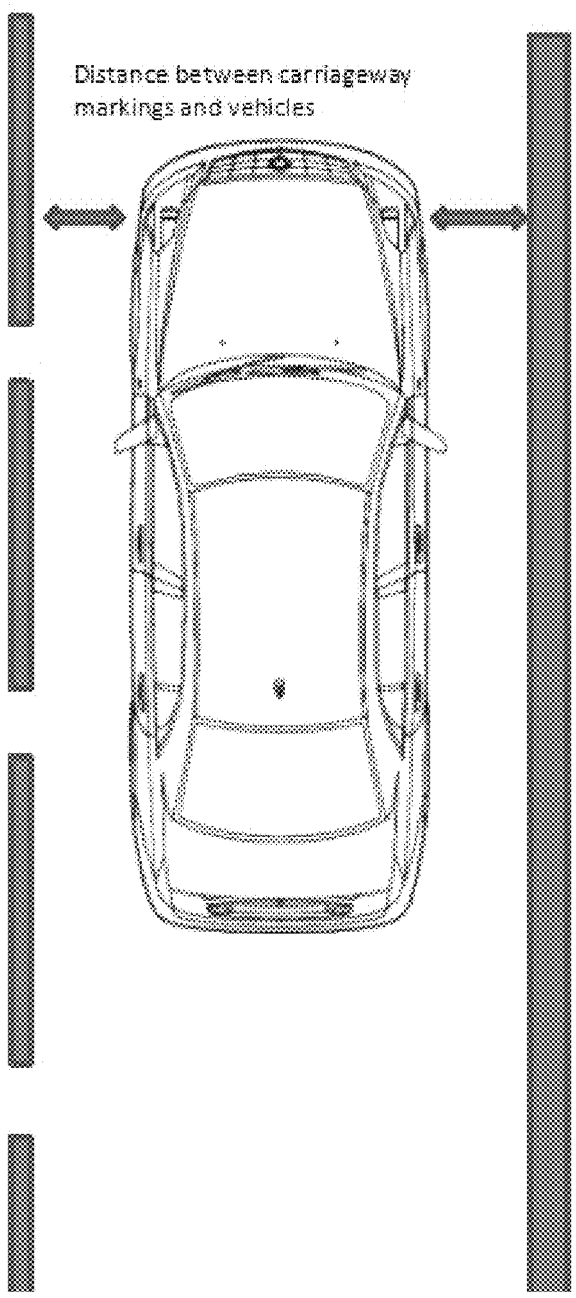
FIG. 19 illustrates distance between carriageway markings and vehicles.

Description: Difference in position between the front of a vehicle and the front of the next vehicle Frequency: 5 Hz Error: less than 1 cm with 99% confidence Acceleration/Deceleration Description: Acceleration/Deceleration of individual vehicle Frequency: 5 Hz Error: less than 5 ft/$s^2$ with 99% confidence Distance between carriageway markings and vehicles See, FIG. 19

Frequency: 5 Hz

Error: Less than 5 cm with 99% confidence

Angle of vehicles and road central lines

Figure 20:
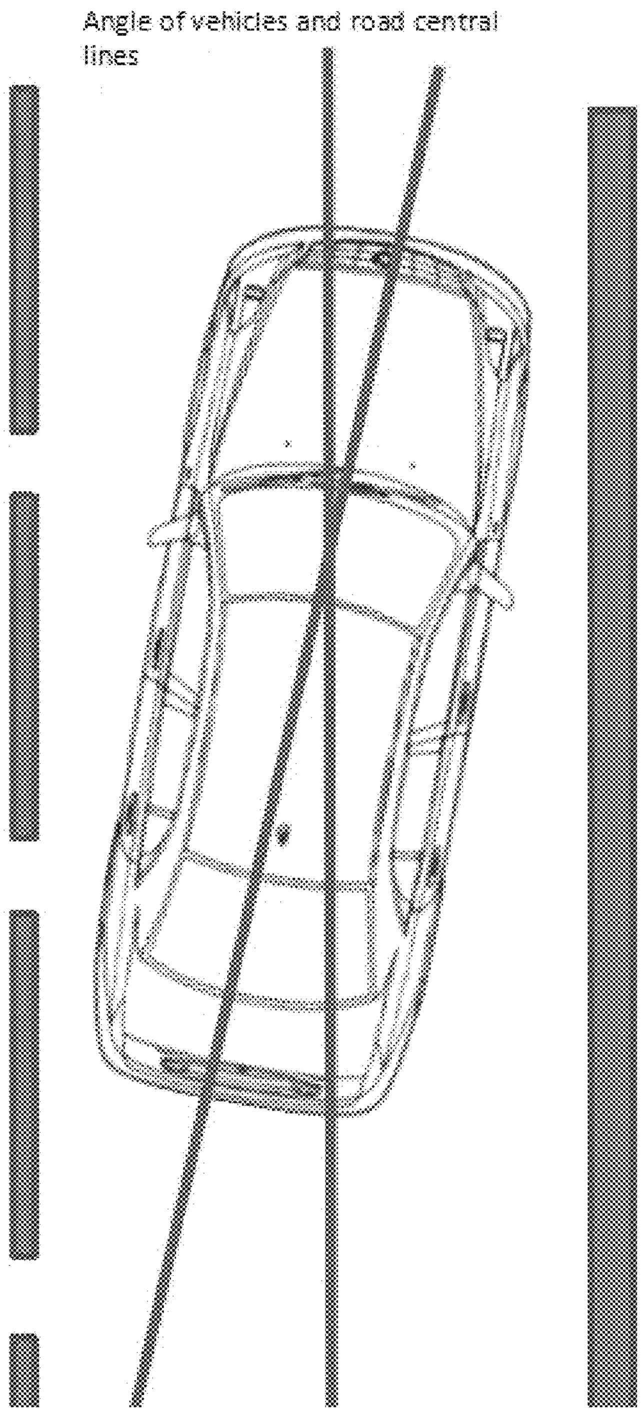
FIG. 20 illustrates angle of vehicles and road central lines.

See, FIG. 20

Frequency: 5 Hz

Error: less than 5° with 99% confidence

Overall traffic state

Figure 21:
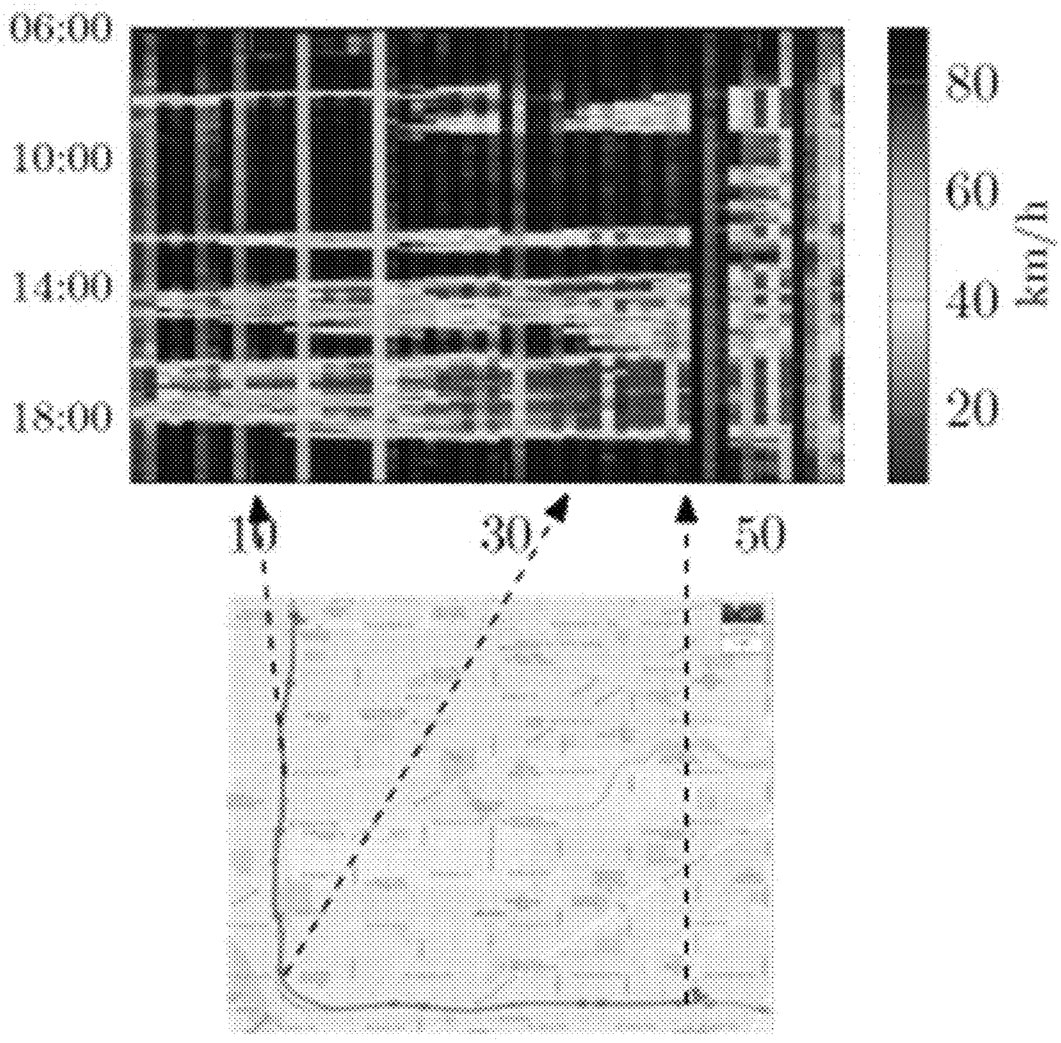
FIG. 21 illustrates an exemplary overall traffic state.

See, FIG. 21

Frequency: 5 Hz

Error: less than 5% error with space resolution of 20 meters

SESING_MODULE_TYPE_A (LIDAR+Camera+Microwave Radar):

a. LIDAR

Hardware technical Specifications

Effective detection distance greater than 50 m

Scan rapidly over a field of view of 360°

Detection error is 99% confidence within 5 cm

Exemplary on-market components that may be employed are:

A. R-Fans_16 from Beijing Surestar Technology Co. Ltd http://www.isurestar.com/index.php/en-product-product.html#9

B. TDC-GPX2 LIDAR of precision-measurement-technologies http://pmt-fl.com/

C. HDL-64E of Velodyne Lidar http://velodynelidar.com/index.html

Software Technical SPECIFICATIONS

Get headway between two vehicles

Get distance between carriageway markings and vehicles

Get the angel of vehicles and central lines.

Exemplary on-market components that may be employed are: LIDAR in ArcGIS b. Camera Hardware technical Specifications 170 degree high-resolution ultra-wide-angle Night Vision Capable Software technical Specifications The error of vehicle detection is 99% confidence above 90%

Lane detection accuracy is 99% confidence above 90%

Drivable path extraction

Get acceleration of passing vehicles

Exemplary on-market components that may be employed are: EyEQ4 from Mobileye http://www.mobileye.com/our-technology/

The Mobileye system has some basic functions: vehicle and pedestrian detection, traffic sign recognition, and lane markings identification (see e.g., barrier and guardrail detection, US20120105639A1, image processing system, EP2395472A1, and road vertical contour detection, US20130141580A1, each of which is herein incorporated reference in its entirety. See also US20170075195A1 and US20160325753A1, herein incorporated by reference in their entireties.

The sensing algorithms of Mobileye use a technique called Supervised Learning, while their Driving Policy algorithms use Reinforcement Learning, which is a process of using rewards and punishments to help the machine learn how to negotiate the road with other drivers (e.g., Deep learning).

c. Microwave Radar

Hardware Technical Specifications

Reliable detection accuracy with isolation belt

Automatic lane segmentation on the multi-lane road

Detection errors on vehicle speed, traffic flow and occupancy are less than 5%

Ability to work under temperature lower than −10° C.

Exemplary on-market components that may be employed are: STJ1-3 from Sensortech http://www.whsensortech.com/

Software technical Specifications

Get speed of passing vehicles

Get volume of passing vehicles

Get acceleration of passing vehicles

In some embodiments, data fusion technology is used such as the product from DF Tech to obtain six feature parameters more accurately and efficiently, and to use a backup plan in case one type of detectors has functional problems.

SESING_MODULE_TYPE_B (Vehicle ID Recognition Device):

Hardware Technical Specifications

Recognize a vehicle based on OBU or vehicle id.

Allowable speed of vehicle movement is up to 150 km/h

Accuracy in daylight and at nighttime with artificial illumination is greater than 90% with 99% confidence Distance from system to vehicle is more than 50 m Exemplary on-market components that may be employed are:

A. Products for Toll Collection—Mobility—SiemensProducts for Toll Collection—Mobility—Siemens https://www.mobility.siemens.com/mobility/global/en/urban-mobility/road-solutions/toll-systems-for-cities/products-for-toll-collection/pages/products-for-toll-collection.aspx B. Conduent™—Toll Collection SolutionsConduent™—Toll Collection Solutions https://www.conduent.com/solution/transportation-solutions/electronic-toll-collection/

Software Technical Specifications

Recognize the vehicle and send the information to the database to link the six feature parameter to each vehicle.

Exemplary on-market components that may be employed are: Siemens.

Data Processing Module

The function of data processing module is to fuse data collected from multiple sensors to achieve the following goals.

Accurate positioning and orientation estimation of vehicles

High resolution-level traffic state estimation

Autonomous path planning

Real time incident detection

Exemplary on-market components that may be employed are: External Object Calculating Module (EOCM) in Active safety systems of vehicle (Buick LaCrosse). The EOCM system integrates data from different sources, including a megapixel front camera, all-new long-distance radars and sensors to ensure a faster and more precise decision-making process. (See e.g., U.S. Pat. No. 8,527,139 B1, herein incorporated by reference in its entirety).

Figure 22:
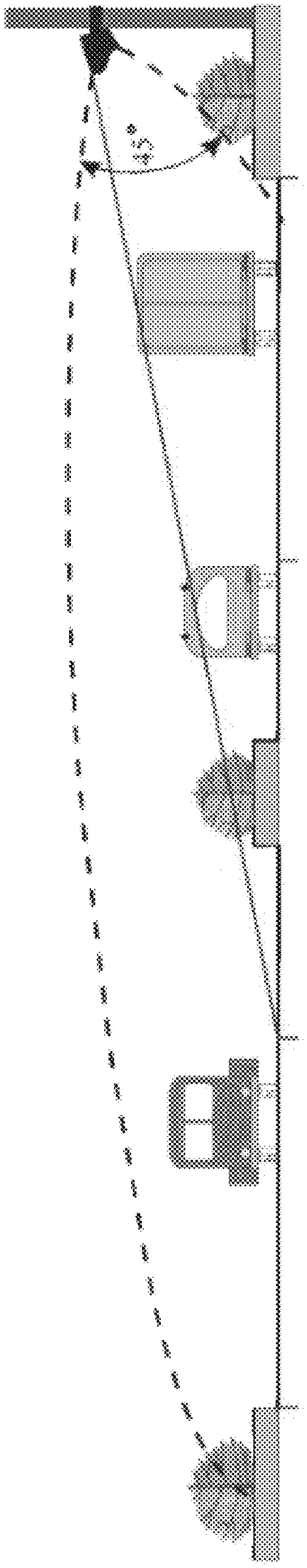
FIG. 22 illustrates installation angle of microwave radar.

Installation:

In some embodiments, one RSU is installed every 50 m along the connected automated highway for one direction. The height is about 40 cm above the pavement. A RSU should be perpendicular to the road during installation. In some embodiments, the installation angle of RSU is as shown in FIG. 22.

Vehicle/OBU

OBU Module Design

Figure 23:
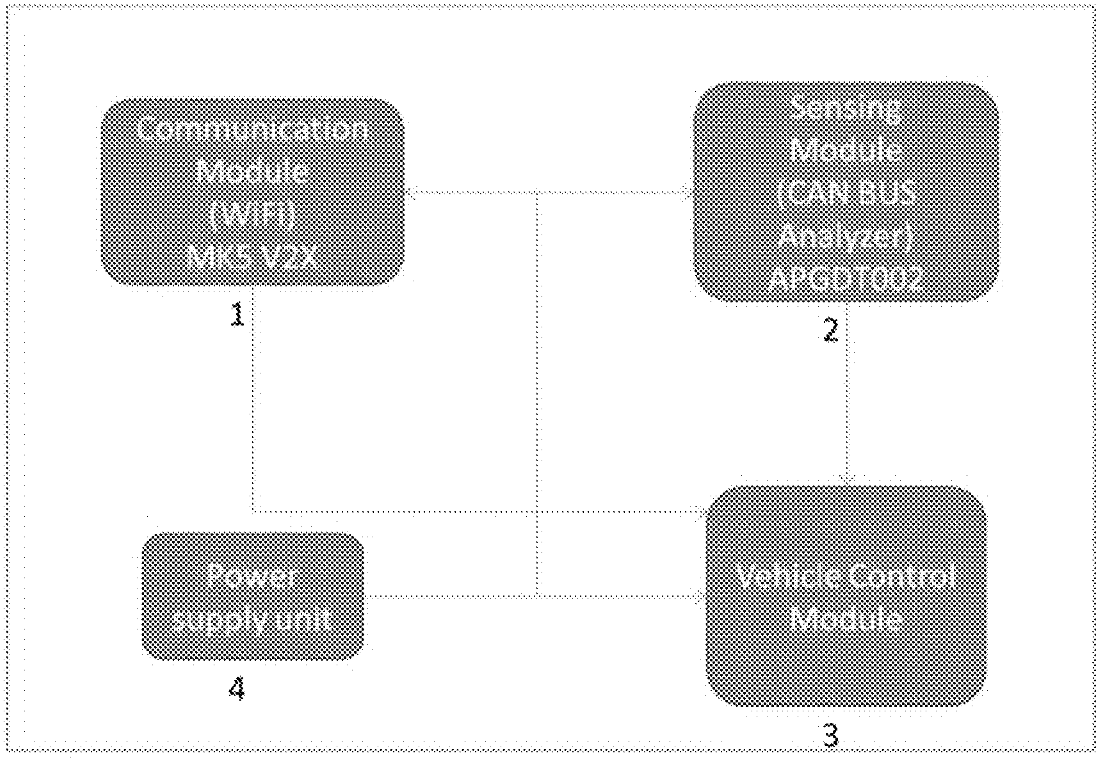
FIG. 23 illustrates an exemplary OBU module design.

Description of an example of OBU (FIG. 23).

The communication module (1) is used to receive both information and command instruction from a RSU. The data collection module (2) is used to monitor the operational state, and the vehicle control module (3) is used to execute control command.

Communication Module

OBU Installation

Technical Specifications:

Standard Conformance: IEEE 802.11p—2010

Bandwidth: 10 MHz

Data Rates: 10 Mbps

Antenna Diversity CDD Transmit Diversity

Environmental Operating Ranges: −40° C. to +55° C.

Frequency Band: 5 GHz

Doppler Spread: 800 km/h

Delay Spread: 1500 ns

Power Supply: 12/24V

Exemplary on-market components that may be employed are:

A. MK5 V2X from Cohda Wireless http://cohdawireless.com/

B. StreetWAVE from Savari http://savari.net/technology/road-side-unit/

Data Collection Module

The data collection module is used to monitor the vehicle operation and diagnosis.

OBU_TYPE_A (CAN BUS Analyzer)

Hardware Technical Specifications

Intuitive PC User Interface for functions such as configuration, trace, transmit, filter, log etc.

High data transfer rate

Exemplary on-market components that may be employed are:

A. APGDT002, Microchip Technology Inc. http://www.microchip.com/

B. Vector CANalyzer9.0 from vector https://vector.com

Software Technical Specifications

Tachograph Driver alerts and remote analysis.

Real-Time CAN BUS statistics.

CO2 Emissions reporting.

Exemplary on-market components that may be employed are: CAN BUS ANALYZER USB V2.0

Vehicle Control Module

Remote Control System

Technical Specifications

Low power consumption

Reliable longitudinal and lateral vehicle control

Exemplary on-market components that may be employed are: Toyota's remote controlled autonomous vehicle. In Toyota's system, the captured data can be sent to a remote operator. The remote operator can manually operate the vehicle remotely or issue commands to the autonomous vehicle to be executed by various vehicle systems. (See e.g., U.S. Pat. No. 9,494,935 32, herein incorporated by reference in its entirety).

Installation

OBU_TYPE_A (CAN BUS Analyzer)

Connect the tool to the CAN network using the DB9 connector or the screw in terminals

TCU/TCC

Figure 24:
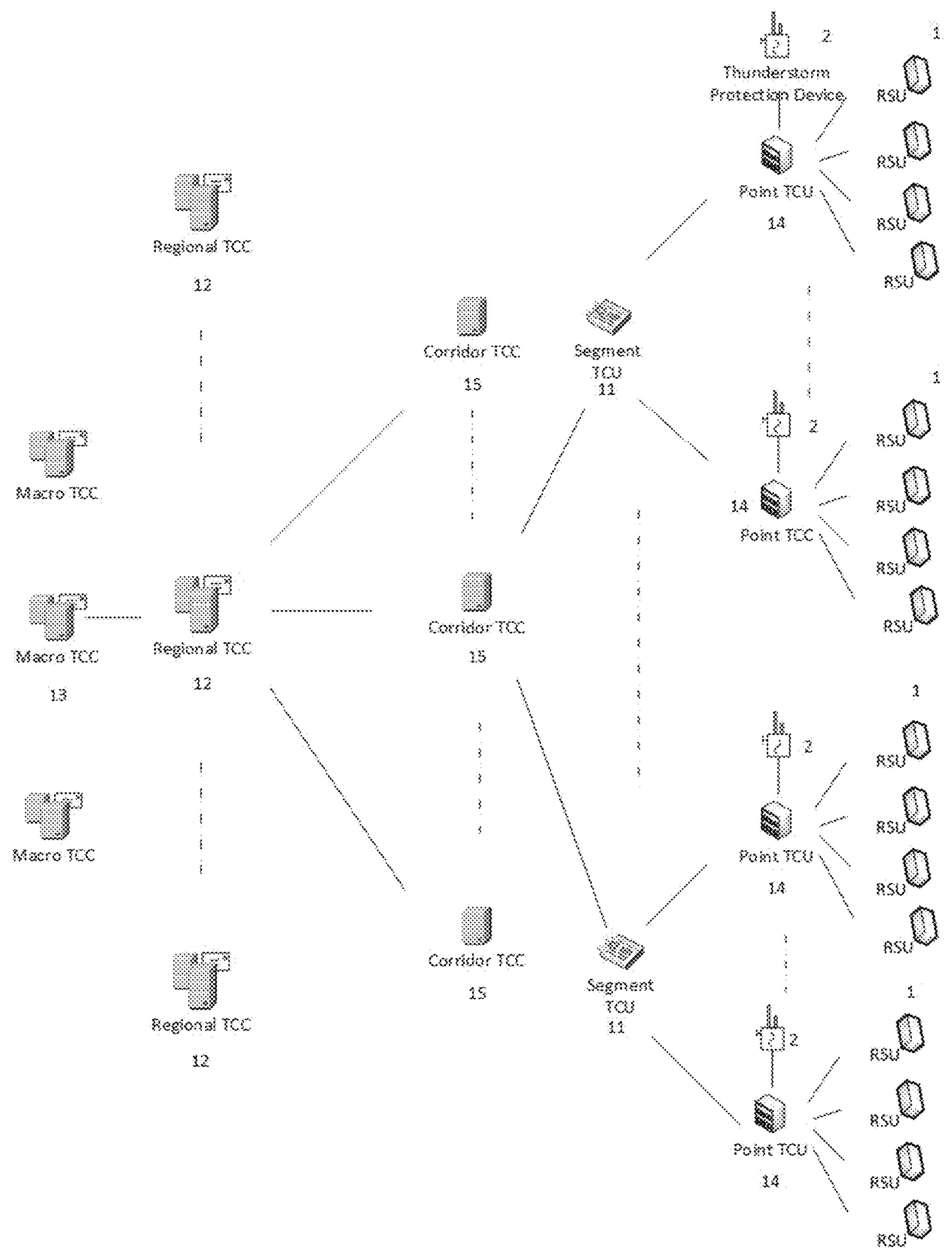
FIG. 24 illustrates an exemplary TCC/TCU structure map.

See e.g., FIG. 24. The TCC/TCU system is a hierarchy of traffic control centers (TCCs) and traffic control units (TCUs), which process information and give traffic operations instructions. TCCs are automatic or semi-automated computational centers that focus on data gathering, information processing, network optimization, and traffic control signals for a region that is larger than short road segments. TCUs are smaller traffic control units with similar functions, but covering a small freeway area, ramp metering, or intersections. There are five different types of TCC/TCU. A point TCU collects and exchanges data from several RSUs. A segment TCC collects data and exchanges data from multiple Point TCUs, optimizes the traffic flow, and controls Point TCU to provide control signal for vehicles. A Corridor TCC collects data from multiple RSUs and optimizes the traffic in a corridor. A Regional TCC collects data from multiple corridors and optimizes traffic flow and travel demand in a large area (e.g. a city is covered by one regional TCC). A Macro TCC collects data from multiple Regional TCCs and optimizes the travel demand in a large-scale area.

For each Point TCU, the data is collected from a RSU system (1). A Point TCU (14) (e.g. ATC-Model 2070L) with parallel interface collects data from a RSU. A thunderstorm protection device protects the RSU and Road Controller system. The RSU unites are equipped at the road side.

A Point TCU (14) communicates with RSUs using wire cable (optical fiber). Point TCUs are equipped at the roadside, which are protected by the Thunderstorm protector (2). Each point TCU (14) is connected with 4 RSU unites. A Point TCU contains the engineering server and data switching system (e.g. Cisco Nexus 7000). It uses data flow software.

Each Segment TCC (11) contains a LAN data switching system (e.g. Cisco Nexus 7000) and an engineering server (e.g. IBM engineering server Model 8203 and ORACL data base). The Segment TCC communicates with the Point TCC using wired cable. Each Segment TCC covers the area along 1 to 2 miles.

The Corridor TCC (15) contains a calculation server, a data warehouse, and data transfer units, with image computing ability calculating the data collected from road controller (14). The Corridor TCC controls Point TCC along a segment, (e.g., the Corridor TCC covers a highway to city street and transition). A traffic control algorithm of TCC is used to control Point TCCs (e.g., adaptive predictive traffic control algorithm). The data warehouse is a database, which is the backup of the corridor TCC (15). The Corridor TCC (15) communicates with segment TCU (11) using wired cord. The calculation work station (KZTs-M1) calculates the data from segment TCU (15) and transfers the calculated data to Segment TCU (11). Each corridor TCC covers 5-20 miles.

Regional TCC (12). Each regional TCC (12) controls multiple Corridor TCCs in a region (e.g. covers the region of a city) (15). Regional TCCs communicate with corridor TCCs using wire cable (e.g. optical fiber).

Macro TCC (13). Each Macro TCC (13) controls multiple regional TCCs in a large-scale area (e.g., each state will have one or two Macro TCCs) (12). Macro TCCs communicate with regional TCCs using wire cable (e.g. optical fiber).

High Resolution Map and Vehicle Location

High Resolution Map

Technical Specifications

- Show carriageway markings and other traffic signs that are printed on roads correctly and clearly.
- As changes occur in the road network, the map will update the information by itself.
- Map error is less than 10 cm with 99% confidence.

Exemplary on-market components that may be employed are:

A. HERE https://here.com/en/products-services/products/here-hd-live-map

The HD maps of HERE allow highly automated vehicles to precisely localize themselves on the road. In some embodiments, the autonomous highway system employs maps that can tell them where the curb is within a few centimeters. In some embodiments, the maps also are live and are updated second by second with information about accidents, traffic backups, and lane closures.

Differential Global Positioning System:

Hardware Technical Specifications

- Locating error less than 5 cm with 99% confidence
- Support GPS system

Exemplary on-market components that may be employed are:

A. Fleetmatics https://www.fleetmatics.com/

B. Teletrac Navman http://drive.teletracnavman.com/

C. Fleetmatics http://lead.fleetmatics.com/

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

We claim:

1. An Autonomous Vehicle Intelligent Control (AVIC) system, comprising:

a traffic control center/traffic control unit (TCC/TCU) comprising automatic or semi automated computational modules that collect data, process information, and provide vehicle-specific control instructions; and a TCC/TCU communication module, wherein:

the TCC/TCU communication module provides wired and wireless communication services to a connected automated vehicle (CAV);

and the TCC/TCU optimizes vehicle-specific control instructions comprising instructions for vehicle longitudinal and lateral position; speed; and steering and control.

2. The AVIC system of claim 1, wherein said TCC/TCU communication module receives data from onboard units (OBUs) and roadside units (RSUs), said data comprising vehicle static information and/or vehicle dynamic information, wherein:

a) the vehicle static information comprises vehicle identifier, vehicle size, vehicle type, vehicle software information, and/or vehicle hardware information; and b) the vehicle dynamic information comprises a timestamp, GPS coordinates, vehicle longitudinal and lateral position, vehicle speed, and/or vehicle origin/destination information.

3. The AVIC system of claim 1, wherein said vehicle-specific control instructions comprise instructions for speed, spacing, lane designation, vehicle following, lane changing, and/or route guidance.

4. The AVIC system of claim 2, wherein said TCC/TCU processes data and integrates the vehicle static information and/or vehicle dynamic information.

5. The AVIC system of claim 1, wherein said automatic or semi-automated computational modules:

a) predict a future motion state of the CAV; and b) dynamically calculate decision-making information according to real-time data and environmental changes.

6. The AVIC system of claim 1, wherein said automatic or semi-automated computational modules predict a future motion state of the CAV based on a preset algorithm.

7. The AVIC system of claim 1, wherein said automatic or semi-automated computational modules receive decision-making information dynamically based on real-time data and environmental changes.

8. The AVIC system of claim 1, wherein said TCC/TCU:

optimizes results to produce optimization results using a predetermined algorithm and generates the vehicle specific control instructions; and produces a control strategy and optimizes the control strategy based on traffic information; or simulates a decision and optimizes the decision.

9. The AVIC system of claim 8, wherein said TCC/TCU generates the vehicle-specific control instructions based on the optimization results.

10. The AVIC system of claim 1, wherein said TCC/TCU communication module sends the vehicle-specific control instructions to an OBU installed in the CAV.

11. An Autonomous Vehicle Intelligent Control (AVIC) System, comprising:

a) a traffic control center/traffic control unit (TCC/TCU) comprising automatic or semi-automated computational modules that collect data, process information, and provide vehicle-specific control instructions; and a TCC/TCU communication module; and b) an onboard unit (OBU) comprising an OBU communication module and a vehicle control module, wherein:

the TCC/TCU produces optimized control strategies for full vehicle operations and control for a connected automated vehicle (CAV) and produces vehicle-specific control instructions comprising instructions for vehicle longitudinal and lateral position, speed, and steering and control;

the OBU communication module communicates with the TCC/TCU, receives the vehicle-specific control instructions from said TCC/TCU, and sends vehicle-specific information to said TCC/TCU; and the vehicle control module controls a vehicle according to said vehicle-specific control instructions.

12. The AVIC system of claim 11, wherein said TCC/TCU communication module receives data from onboard units (OBUs) and roadside units (RSUs), said data comprising vehicle static information and/or vehicle dynamic information, wherein:

the vehicle static information comprises vehicle identifier, vehicle size, vehicle type, vehicle software information, and/or vehicle hardware information; and the vehicle dynamic information comprises a timestamp, GPS coordinates, vehicle longitudinal and lateral position, vehicle speed, and/or vehicle origin/destination information.

13. The AVIC system of claim 11, wherein said vehicle-specific control instructions further comprise instructions for spacing, lane designation, vehicle following, lane changing, and/or route guidance.

14. The AVIC system of claim 12, wherein said TCC/TCU processes data received by a data center and integrates the vehicle static information and/or vehicle dynamic information.

15. The AVIC system of claim 11, wherein said automatic or semi automated computational modules predict the future motion state of the CAV; and dynamically calculate decision making information according to real-time data and environmental changes.

16. The AVIC system of claim 11, wherein said automatic or semi-automated computational modules predict a future motion state of the CAV based on preset algorithms.

17. The AVIC system of claim 11, wherein said automatic or semi automated computational modules calculate decision making information dynamically based on real-time data and environmental changes.

18. The AVIC system of claim 11, wherein said TCC/TCU optimizes results using a preset algorithm and generates the vehicle-specific control instructions; and produces an optimal control strategy, or optimizes the plan based on traffic information, or simulates the decision and optimizes it.

19. The AVIC system of claim 11, wherein said TCC/TCU communication module sends the vehicle-specific control instructions to the OBU.

20. The AVIC system of claim 11, wherein the OBU communication module receives the vehicle-specific control instructions and the vehicle control module controls the CAV using the vehicle-specific control instructions.

* * * * *